(12) United States Patent
Okamura

(10) Patent No.: US 7,509,944 B2
(45) Date of Patent: Mar. 31, 2009

(54) ENGINE FUEL SUPPLY APPARATUS AND ENGINE FUEL SUPPLY METHOD

(75) Inventor: Manabu Okamura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 91 days.

(21) Appl. No.: 11/757,470

(22) Filed: Jun. 4, 2007

(65) Prior Publication Data

US 2007/0283934 A1 Dec. 13, 2007

(30) Foreign Application Priority Data

Jun. 12, 2006 (JP) ............................. 2006-162096

(51) Int. Cl.
*F02M 51/00* (2006.01)
*F02M 51/06* (2006.01)

(52) U.S. Cl. ..................... 123/478; 701/104; 73/114.49

(58) Field of Classification Search ................. 123/495, 123/472, 478, 480, 482, 490, 434, 436; 701/103, 701/104, 105; 73/114.43, 114.49
See application file for complete search history.

(56) References Cited

U.S. PATENT DOCUMENTS 6,170,459 B1 * 1/2001 Ono et al. ................... 123/305

6,298,830 B1 * 10/2001 Kono ......................... 123/478
6,792,917 B2 * 9/2004 Kohketsu et al. ............ 123/446
7,287,515 B2 * 10/2007 Okamura et al. ............ 123/494
7,418,337 B2 * 8/2008 Toyohara et al. ............ 701/104

FOREIGN PATENT DOCUMENTS

JP 2000-320385 11/2000

* cited by examiner

*Primary Examiner*—Mahmoud Gimie
(74) *Attorney, Agent, or Firm*—Global IP Counselors, LLP

(57) ABSTRACT

In an engine fuel supply method, a first fuel pressure difference between a fuel injection amount computation timing and a first fuel injection timing and a second fuel pressure difference between the fuel injection amount computation timing and a second fuel injection timing are estimated at the fuel injection amount computation timing based on a control state of a fuel pneumatic transportation amount of a high-pressure fuel pump. The first fuel injection amount is corrected based on the first fuel pressure difference and the second fuel injection amount is corrected based on the second fuel pressure difference. A fuel injection valve is selectively controlled to supply the high-pressure fuel directly into a cylinder of the engine at the first fuel injection timing with the corrected first fuel injection amount and at the second fuel injection timing with the corrected second fuel injection amount.

19 Claims, 23 Drawing Sheets

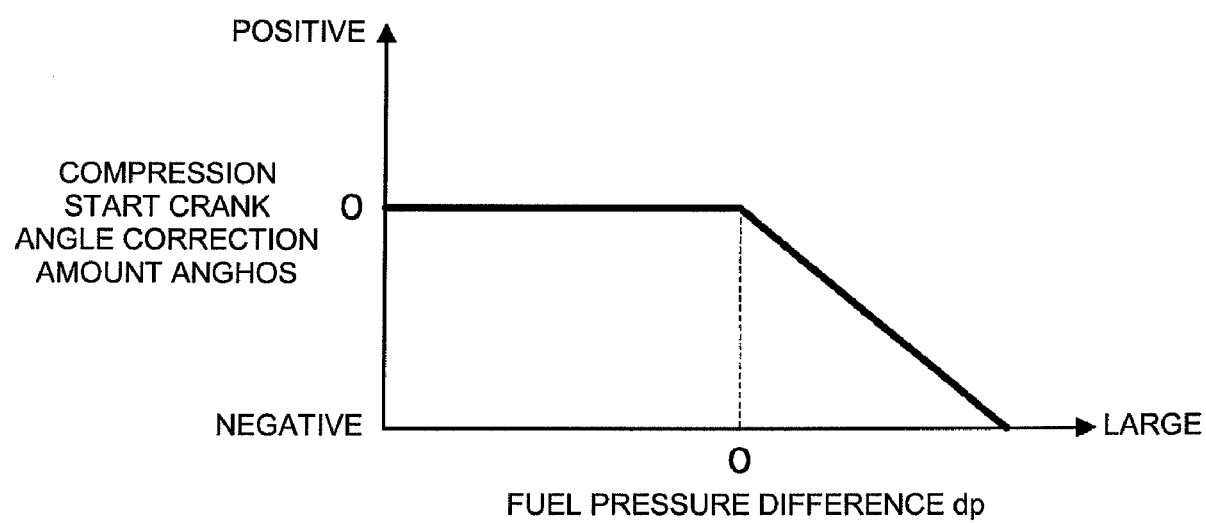
F I G. 9

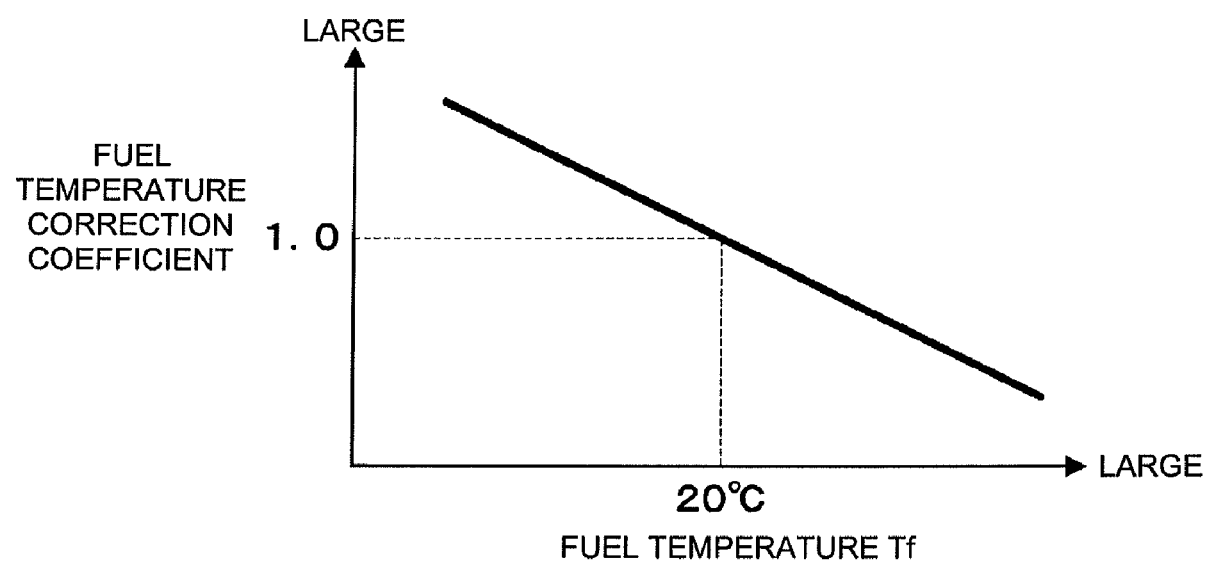
F I G. 14

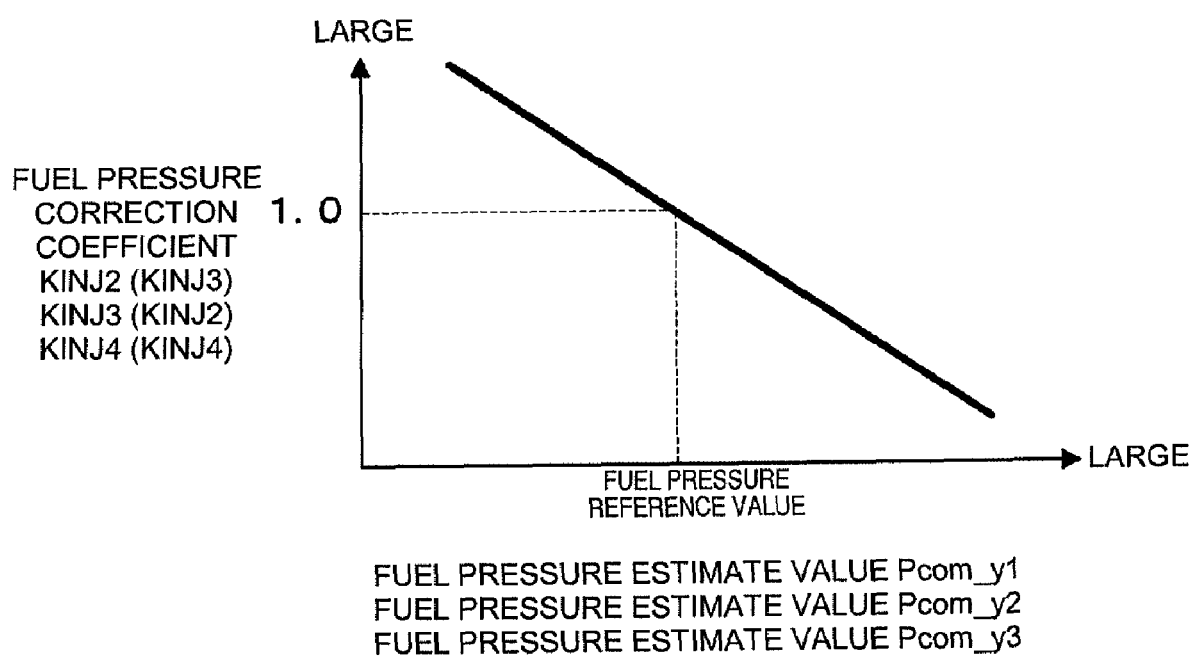
F I G. 15

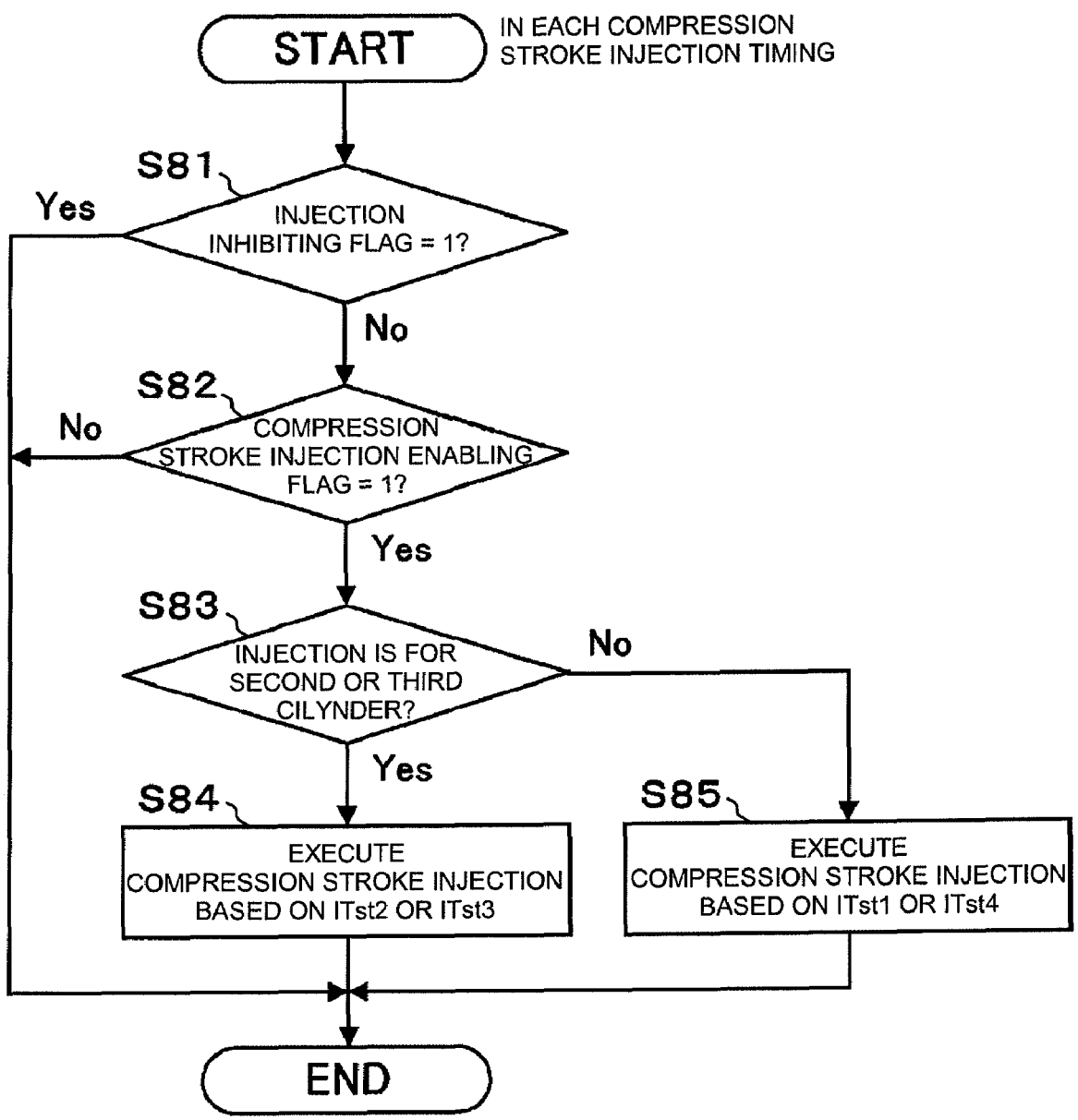
F I G. 16A

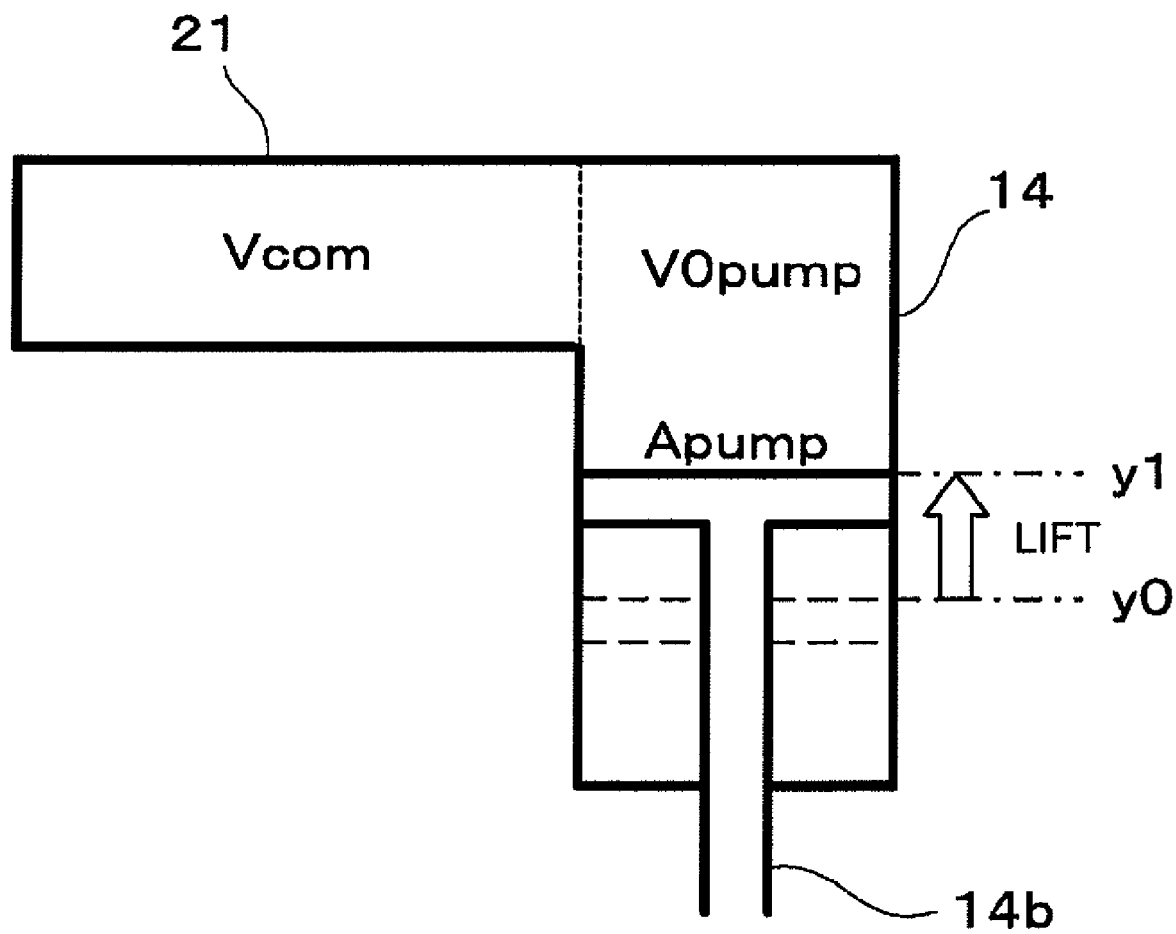
F I G. 17

ENGINE FUEL SUPPLY APPARATUS AND ENGINE FUEL SUPPLY METHOD

CROSS-REFERENCE TO RELATED APPLICATIONS

This application claims priority to Japanese Patent Application No. 2006-162096 filed on Jun. 12, 2006. The entire disclosure of Japanese Patent Application No. 2006-162096 is hereby incorporated herein by reference.

BACKGROUND OF THE INVENTION

1. Field of the Invention

The present invention relates to an engine fuel supply apparatus and an engine fuel supply method. More specifically, the present invention relates to an engine fuel supply apparatus and an engine fuel supply method for supplying a high-pressure fuel discharged from a high-pressure fuel pump driven by an engine to a fuel injection valve.

2. Background Information

Japanese Laid-Open Patent Application Publication No. 2000-320385 discloses a conventional engine fuel supply apparatus including an actuator driven by a crankshaft, a high-pressure fuel pump driven by the actuator to discharge high-pressure fuel, and a fuel injection valve selectively opened at a predetermined fuel injection timing to supply the high-pressure fuel from the high-pressure fuel pump to the engine. In such conventional engine fuel supply apparatus, a fuel injection timing for a subsequent cycle is computed using a fuel pressure detected prior to the fuel injection in a current cycle as an estimate value of the fuel pressure in a cylinder in the subsequent cycle.

In view of the above, it will be apparent to those skilled in the art from this disclosure that there exists a need for an improved engine fuel supply apparatus and engine fuel supply method. This invention addresses this need in the art as well as other needs, which will become apparent to those skilled in the art from this disclosure.

SUMMARY OF THE INVENTION

When a fuel injection valve is opened at a fuel injection timing in a compression stroke to directly supply a high-pressure fuel from a high-pressure fuel pump to an engine combustion chamber, a fuel injection amount can be computed at a fuel injection amount computation timing based on an operating state of the engine (such as an engine revolution speed, a load and the like) and a fuel pressure in a high-pressure fuel piping. However, when a time lag exists between a timing at which the fuel injection amount is computed and the fuel injection timing at which the fuel is actually injected, a fuel pressure increase may cause the excessive actual fuel supply, which possibly results in worsening of exhaust emission or fuel consumption.

Also, when a fuel injection timing for an additional fuel injection subsequent to the compression stroke injection is computed at the fuel injection amount computation timing before the compression stroke fuel injection, the actual fuel supply amount in the additional fuel injection becomes excessive unless the fuel pressure increase between the computation timing and the fuel injection timing is considered. This possibly results in the worsening of the exhaust emission or fuel consumption.

However, the Japanese Laid-Open Patent Application Publication No. 2000-320385 as mentioned above is silent about the time lag between the fuel injection amount computation timing and the actual fuel injection timing.

The present invention has been contrived in view of the foregoing problems in the art, and one object of the invention is to provide an engine fuel supply apparatus and an engine fuel supply method configured and arranged to supply fuel to an engine at an actual fuel injection timing with no excessive fuel injection amount even in the fuel injection control in which calculation of a plurality of fuel injection timings are performed at the same computation timing.

According to one aspect of the present invention, an engine fuel supply method is provided. In the engine fuel supply method, a high-pressure fuel pump is driven to pneumatically transport high-pressure fuel to a fuel pipe. A fuel pneumatic transportation amount of the high-pressure fuel pump is controlled to adjust a fuel pressure in the fuel pipe to a predetermined pressure. A first fuel injection amount for a first fuel injection and a second fuel injection amount for a second fuel injection, which is performed after the first fuel injection, are simultaneously determined at a fuel injection amount computation timing based on the fuel pressure in the fuel pipe and an operating condition of an engine. A first fuel pressure difference between the fuel injection amount computation timing and a first fuel injection timing for the first fuel injection and a second fuel pressure difference between the fuel injection amount computation timing and a second fuel injection timing for the second fuel injection are estimated at the fuel injection amount computation timing based on a control state of the fuel pneumatic transportation amount of the high-pressure fuel pump. The first fuel injection amount is corrected based on the first fuel pressure difference. A fuel injection valve provided in the fuel pipe is selectively controlled to supply the high-pressure fuel directly into a cylinder of the engine at the first fuel injection timing with the corrected first fuel injection amount. The second fuel injection amount is corrected based on the second fuel pressure difference. The fuel injection valve is selectively controlled to supply the high-pressure fuel directly into the cylinder of the engine at the second fuel injection timing with the corrected second fuel injection amount.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 9 is an example of a characteristic diagram of a compression start crank angle correction amount with respect to a fuel pressure difference used in the engine fuel supply apparatus according to the first embodiment of the present invention;

FIG. 14 is an example of a characteristic diagram of a fuel temperature correction coefficient with respect to a fuel temperature used in the engine fuel supply apparatus according to the first embodiment of the present invention;

FIG. 15 is an example of a characteristic diagram of a second or third cylinder fuel pressure correction coefficient with respect to a fuel pressure estimate value used in the engine fuel supply apparatus according to the first embodiment of the present invention;

FIG. 16A is a flowchart for explaining a control process for executing a compression stroke injection executed in the engine fuel supply apparatus according to the first embodiment of the present invention;

FIG. 17 is a schematic diagram illustrating a volume model of a plunger pump and a common-rail in the engine fuel supply apparatus in accordance with the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
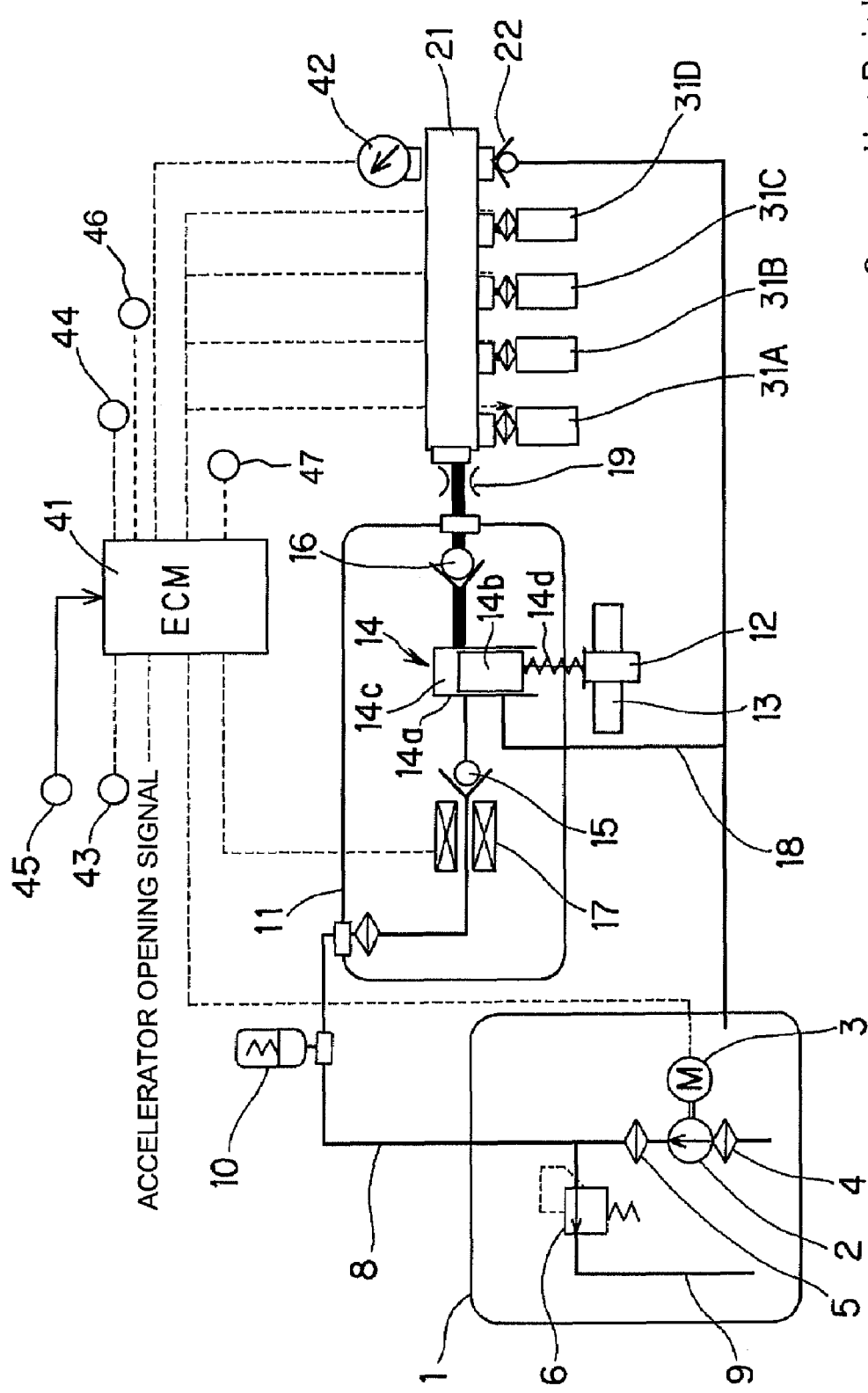
FIG. 1 is a schematic diagram of an engine fuel supply apparatus according to a first embodiment of the present invention.
Figure 2:
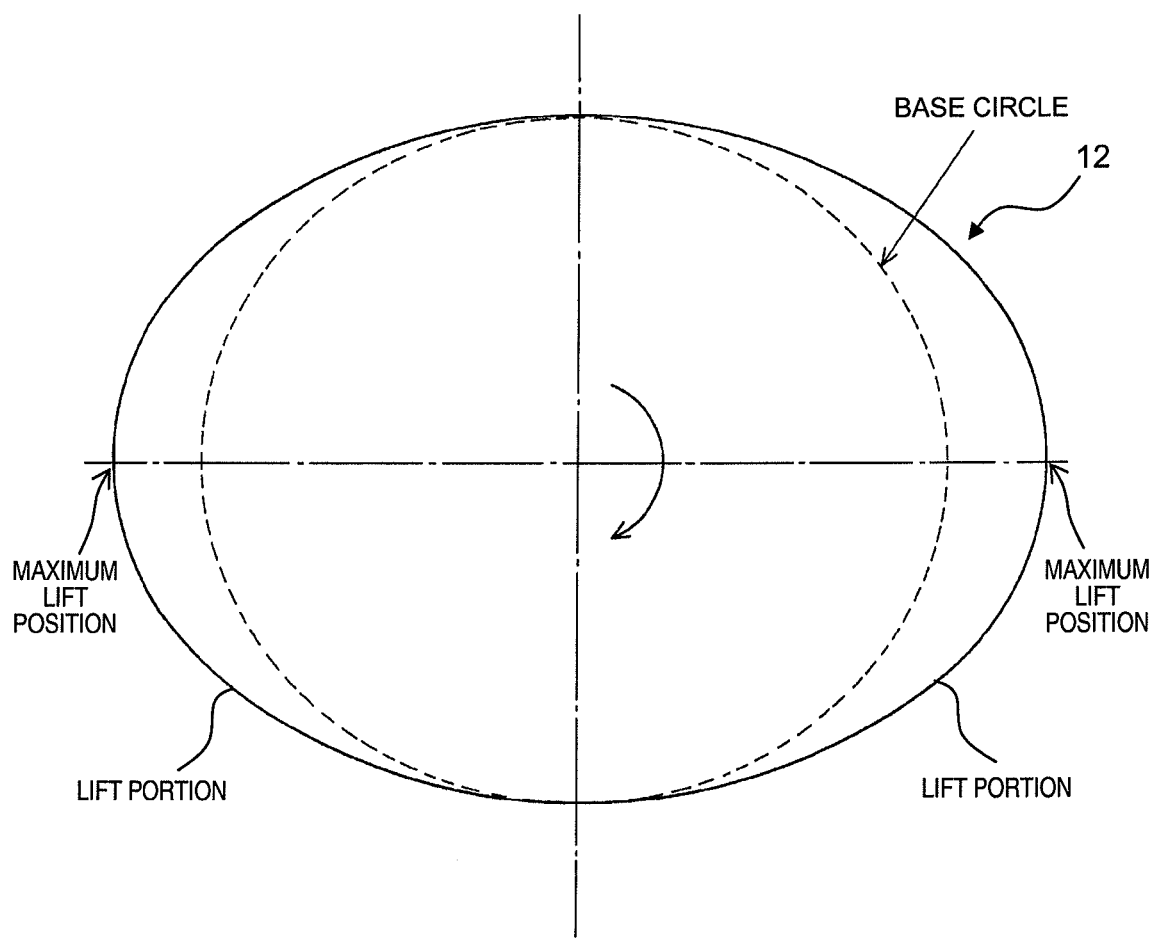
FIG. 2 is a plan view of a pump drive cam provided in the engine fuel supply apparatus according to the first embodiment of the present invention.
Figure 3:
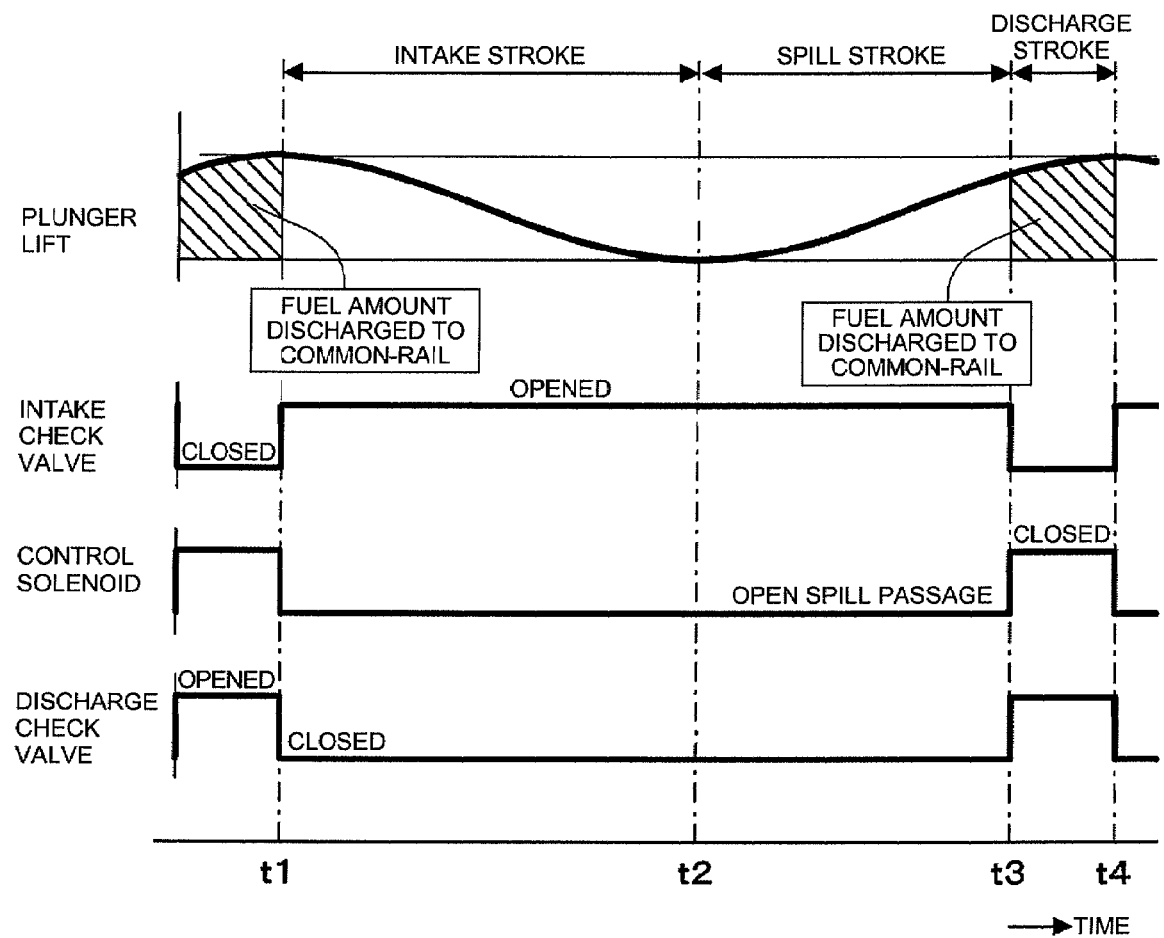
FIG. 3 is a waveform chart for explaining an operation of a high-pressure fuel pump of the engine fuel supply apparatus according to the first embodiment of the present invention.

Referring initially to FIGS. 1 to 3, an engine fuel supply apparatus and method is illustrated in accordance with a first embodiment of the present invention. FIG. 1 is a schematic view showing an engine fuel supply apparatus according to the first embodiment.

As shown in FIG. 1, the engine is provided with a fuel tank 1, a feed pump 2, an electric motor 3, a pair of fuel filters 4 and 5, a low-pressure regulator 6, a fuel supply passage 8, a return passage 9, a damper 10, a high-pressure fuel pump 11, a pump drive cam 12, an intake valve cam shaft 13, a spill passage 18, a common-rail (fuel gallery) 21, a safety valve 22, a plurality of fuel injection valves 31A to 31D, an engine controller 41, a fuel pressure sensor 42, a crankshaft position sensor 43, a camshaft position sensor 44, a starter switch 45, an air flow sensor 46 and a fuel temperature sensor 47.

The feed pump 2 is driven by the electric motor 3 to pneumatically transport the fuel contained in the fuel tank 1 to the fuel supply passage 8. The fuel filters 4 and 5 are provided on the upstream and downstream sides of the feed pump 2, respectively. The low-pressure regulator 6 is provided in the return passage 9 such that a discharge pressure of the feed pump 2 does not exceed a predetermined pressure. The return passage 9 is branched from the fuel supply passage 8 and returned to the fuel tank 1.

The discharge fuel from the feed pump 2 is supplied to the high-pressure fuel pump 11 through the fuel supply passage 8. The damper 10 is provided in the fuel supply passage 8 for suppressing pulsation of the fuel pressure.

The configuration of the high-pressure fuel pump 11 in accordance with the first embodiment of the present invention will be described below. The high-pressure fuel pump 11 includes the pump drive cam 12, a plunger pump 14, a normally closed intake check valve 15, a normally closed discharge check valve 16, and a control solenoid 17. The pump drive cam 12 (plate cam) is arranged as an actuator which is driven by a crankshaft (not shown). The plunger pump 14 is driven by the pump drive cam 12. The plunger pump 14 includes a cylinder 14a, a plunger 14b, a high-pressure chamber 14c, and a spring 14d. The plunger pump 14 is connected to the spill passage 18 as shown in FIG. 1. The plunger 14b is driven on a peripheral surface of the pump drive cam 12 to be vertically moved in a reciprocating motion. The high-pressure chamber 14c is defined by the plunger 14b and the cylinder 14a. The spring 14d biases the plunger 14b toward the peripheral surface of the pump drive cam 12. The spill passage 18 returns the fuel of the high-pressure chamber 14c to the fuel tank 1.

FIG. 2 is a plan view of the pump drive cam 12 (plate cam), and FIG. 3 is a waveform chart explaining the operation of the high-pressure fuel pump 11 of the engine fuel supply apparatus. As shown in FIG. 2, the pump drive cam 12 has a pair of lift portions at positions which are separated from each other by 180 degrees, and each lift portion is raised from a base circle. In FIG. 2, when the pump drive cam 12 is rotated clockwise, the spring 14d is lowered to the base circle from a maximum lift position located on the right or left of FIG. 2. Because the spring 14d biases the plunger 14b toward the pump drive cam 12, the plunger 14b is moved downward in FIG. 1. The pump drive cam 12 is further rotated, and the spring 14d is lifted from the base circle to the other maximum lift position located on the opposite side, which moves the plunger 14b upward in FIG. 1.

FIG. 3 shows a waveform model of the operation of the high-pressure fuel pump 11. When the intake check valve 15 is opened at time t1 when the plunger 14b is located at a highest lift position, and then, the plunger 14b is lowered from the highest lift position and reaches a lowest lift position at time t2, the low-pressure fuel is taken in the high-pressure chamber 14c from the feed pump 2. That is, the interval between time t1 and time t2 is an intake stroke of the high-pressure fuel pump 11.

The plunger 14b is lifted from time t2 toward the highest lift position. At this point, because the engine controller 41 is configured to control the control solenoid 17 to open the spill passage 18, the fuel of the high-pressure chamber 14c is merely returned to the fuel tank 1 through the spill passage 18, and the fuel of the high-pressure chamber 14c is not pneumatically transported to the common-rail 21.

Once the plunger 14b is lifted, and the engine controller 41 is configured to control the control solenoid 17 to close the spill passage 18 at time t3. Then, a fuel pressure of the high-pressure chamber 14c is increased to open the discharge check valve 16 during the interval from time t3 to time t4 at which the plunger 14b reaches the highest lift position. Therefore, the high-pressure fuel is supplied to the common-rail 21 through an orifice 19. That is, the interval between time t2 and time t3 is a spill stroke of the high-pressure fuel pump 11, and the interval between time t3 and time t4 is a discharge stroke of the high-pressure fuel pump 11. The interval from t1 to t4 is a series of operations, and the series of operations is repeated after time t4.

A discharge quantity of the high-pressure fuel pump 11 is increased as the timing (time t3), at which the control solenoid 17 closes the spill passage 18, is advanced, and the discharge quantity of the high-pressure fuel pump 11 is decreased as the timing at which the control solenoid 17 closes the spill passage 18 is retarded. For this reason, the discharge quantity of the high-pressure fuel pump 11 can be controlled by adjusting the timing at which the control solenoid 17 closes the spill passage 18 to the side of an advance angle or a retard angle.

Returning to FIG. 1, the pump drive cam 12 is integrally formed with the intake valve camshaft 13. A chain or a belt is entrained about a cam sprocket fixed to a front end of the intake valve camshaft 13 and a crank sprocket fixed to a front end of a crankshaft (not shown). Thus, the intake valve camshaft 13 is indirectly driven by the crankshaft.

The safety valve 22 is provided at a rear end of the common-rail 21. When the actual common-rail fuel pressure exceeds an allowable pressure, the safety valve 22 is opened to return part of the high-pressure fuel contained in the common-rail 21 to the fuel tank 1.

The high-pressure fuel accumulated in the common-rail 21 is distributed into the high-pressure fuel injection valves 31A to 31D of the cylinders. FIG. 1 shows a case of a four-cylinder engine in which the high-pressure fuel accumulated in the common-rail 21 acts on the four high-pressure fuel injection valves 31A, 31B, 31C, and 31D.

When each of the fuel injection valves 31A to 31D is opened according to ignition timing (ignition sequence or order) of the cylinders, the fuel is supplied to a combustion chamber of the cylinder corresponding to the fuel injection valve that is opened. For example, it is assumed that the first cylinder has the fuel injection valve 31A, the second cylinder has the fuel injection valve 31B, the third cylinder has the fuel injection valve 31C, the fourth cylinder has the fuel injection valve 31D, and the ignition timing has a sequence of the first cylinder, the third cylinder, the fourth cylinder and the second cylinder (1-3-4-2). Thus, the fuel injection valves 31A, 31C, 31D, and 31B are opened in this order at predetermined fuel injection timings. The common-rail fuel pressure is decreased since a predetermined amount of fuel is injected from the fuel injection valves 31A to 31D.

The engine controller 41 preferably includes a microcomputer with a fuel injection control program that controls the operation of the fuel injection valves 31A to 31D as discussed below. The engine controller 41 can also include other conventional components such as an input interface circuit, an output interface circuit, and storage devices such as a ROM (Read Only Memory) device and a RAM (Random Access Memory) device. The microcomputer of the engine controller 41 is programmed to control the various components of the engine. The memory circuit stores processing results and control programs such as ones for the fuel injection start time computation operation that are run by the processor circuit. The engine controller 41 is operatively coupled to the various components of the engine in a conventional manner. The internal RAM of the engine controller 41 stores statuses of operational flags and various control data. The engine controller 41 is capable of selectively controlling any of the components of the control system in accordance with the control program. It will be apparent to those skilled in the art from this disclosure that the precise structure and algorithms for the engine controller 41 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The engine controller 41 stores a target fuel pressure of the common-rail 21 corresponding to an engine load and a revolution speed in the form of a map in advance. The engine controller 41 is configured to control the discharge quantity (an example of the fuel pneumatic transportation amount) of the high-pressure fuel pump 11 through the control solenoid 17 such that an actual common-rail fuel pressure detected by the fuel pressure sensor 42 is matched with the target fuel pressure of the common-rail 21 corresponding to the engine load and revolution speed at that time. For example, when the actual common-rail fuel pressure is lower than the target fuel pressure, the timing at which the control solenoid 17 closes the spill passage 18 is advanced to increase the discharge quantity of the high-pressure fuel pump 11, thereby increasing the actual common-rail fuel pressure close to the target fuel pressure. On the contrary, when the actual common-rail fuel pressure is higher than the target fuel pressure, the timing at which the control solenoid 17 closes the spill passage 18 is retarded to decrease the discharge quantity of the high-pressure fuel pump 11, thereby decreasing the actual common-rail fuel pressure close to the target fuel pressure.

The engine controller 41 is configured to compute a basic injection pulse width Tp (injection duration) based on an engine revolution speed Ne and an intake air quantity Qa detected by the air flow sensor 46, and to compute a fuel pressure correction coefficient KINJ based on the actual common-rail fuel pressure detected by the fuel pressure sensor 42. Then, the engine controller 41 is configured to multiply the fuel pressure correction coefficient KINJ by the basic injection pulse width Tp (corrects the basic injection pulse width Tp) to compute a fuel injection pulse width Ti to be applied to the fuel injection valves 31A to 31D. The engine controller 41 is then configured to individually open the fuel injection valves 31A to 31D at predetermined fuel injection timings only for the fuel injection pulse width Ti to supply the fuel to each cylinder.

Figure 11:
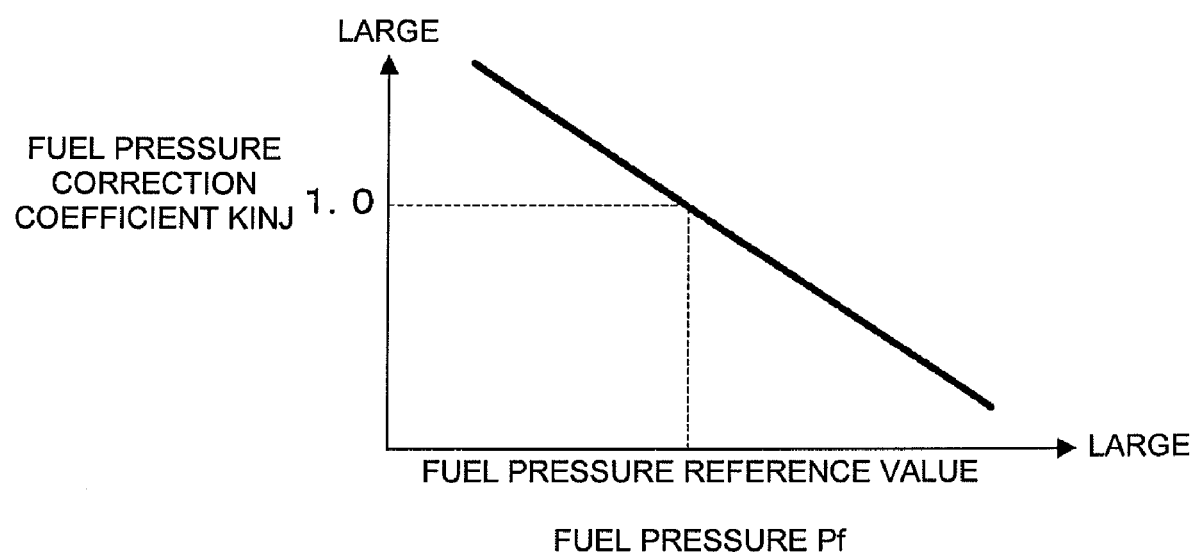
FIG. 11 is an example of a characteristic diagram of a fuel pressure correction coefficient with respect to a fuel pressure used in the engine fuel supply apparatus according to the first embodiment of the present invention.

The fuel pressure correction coefficient KINJ is given as shown in FIG. 11. The fuel pressure correction coefficient KINJ is 1.0 at a common-rail fuel pressure reference value. The fuel pressure correction coefficient KINJ is decreased from 1.0 as the actual common-rail fuel pressure is increased from the common-rail fuel pressure reference value, and on the other hand, the fuel pressure correction coefficient KINJ is increased from 1.0 as the actual common-rail fuel pressure is decreased from the common-rail fuel pressure reference value.

The reason why a positive value smaller than 1.0 is given to the fuel pressure correction coefficient KINJ when the actual common-rail fuel pressure is higher than the common-rail fuel pressure reference value is as follows. The fuel injection amount is increased as the common-rail fuel pressure is increased in the case of the same basic injection pulse width Tp, and the fuel injection amount is increased as the basic injection pulse width Tp is increased in the case of the same common-rail fuel pressure. Assume that the basic injection pulse width Tp is determined such that a fuel quantity required for the common-rail fuel pressure reference value is supplied. If the same basic injection pulse width Tp is given even when the actual common-rail fuel pressure becomes higher than the common-rail fuel pressure reference value, the fuel quantity is excessively supplied by a difference between the fuel pressure and the common-rail fuel pressure reference value. Therefore, when the actual common-rail fuel pressure becomes higher than the common-rail fuel pressure reference value, a positive value smaller than 1.0 is given to the fuel pressure correction coefficient KINJ to perform decreasing correction of the basic injection pulse width Tp. As a consequence, the fuel is supplied so as not to exceed the required fuel quantity even if the actual common-rail fuel pressure becomes higher than the common-rail fuel pressure reference value.

Similarly, a positive value larger than 1.0 is given to the fuel pressure correction coefficient KINJ when the actual common-rail fuel pressure is smaller than the common-rail fuel pressure reference value. This is also because the fuel is supplied so as not to fall below the required fuel quantity when the actual common-rail fuel pressure becomes lower than the common-rail fuel pressure reference value.

In the first embodiment, the high-pressure fuel injection valves 31A to 31D are arranged to face the combustion chambers of the cylinders, respectively, and the compression stroke injection is performed to directly supply the fuel to the combustion chamber in each cylinder during the engine start-up, which executes the stratified combustion.

When an injection end time (crank angle) is fixed in the compression stroke injection, a crank angle position on the side of the advance angle with respect to the injection end time becomes an injection start time (fuel injection timing) in the compression stroke injection. The crank angle position is advanced from the fixed injection end time by a value obtained by converting a predetermined fuel injection pulse width Ti (=Tp×KINJ) corresponding to a required fuel quantity into a crank angle using an engine revolution speed at that time. For this reason, prior to an actual fuel injection timing in the compression stroke injection, an injection start time computation timing is determined in the compression stroke injection to compute an injection start time in the compression stroke injection. Therefore, there is a time lag between the injection start time computation timing in the compression stroke injection and the actual fuel injection timing in the compression stroke injection.

When a time lag exists between the injection start time computation timing in the compression stroke injection and the actual fuel injection timing in the compression stroke injection, an error is generated in the computation of the injection start time in the compression stroke injection, and the fuel is excessively supplied in the compression stroke injection, which results in the worsening of exhaust emission or fuel consumption.

Figure 4:
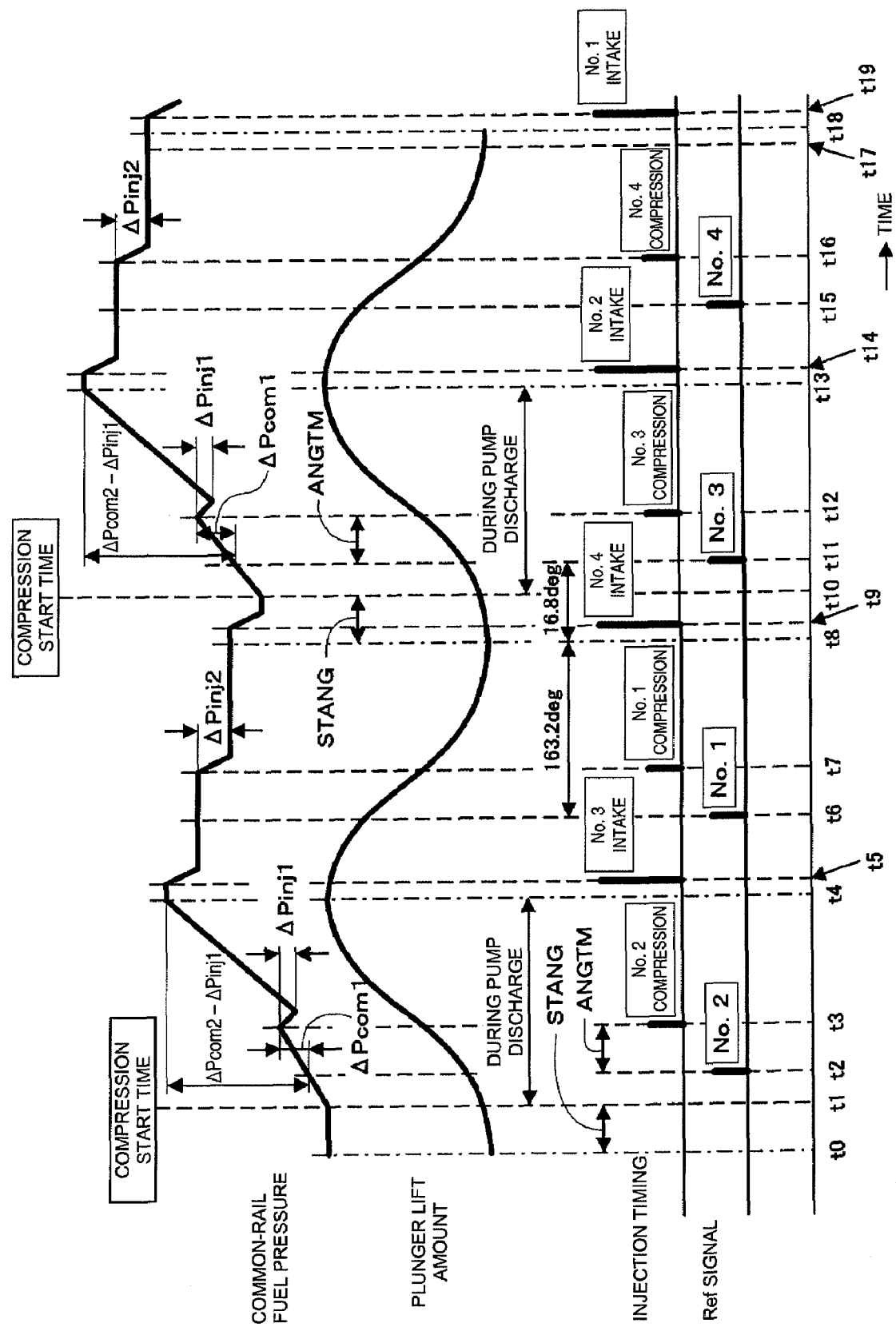
FIG. 4 is a waveform chart for explaining changes in a common-rail fuel pressure and a plunger lift amount in the high-pressure fuel pump over time in the engine fuel supply apparatus according to the first embodiment of the present invention.

Referring now to FIG. 4, the uppermost part of FIG. 4 shows a waveform model of a change in common-rail fuel pressure immediately after the cranking.

In FIG. 4, not only the compression stroke injection is performed in each cylinder, but also an intake stroke injection is performed for a cylinder which is reaching an intake stroke between the adjacent compression stroke injections. Therefore, first, the compression stroke injection will be described, and then, the intake stroke injection performed between the adjacent compression stroke injections will be described.

Referring to the uppermost part of FIG. 4, when the cranking is started, the high-pressure fuel pump 11 begins to operate, the common-rail fuel pressure is increased from time t1, and the compression stroke injection is performed at time t3 in the second cylinder. The common-rail fuel pressure is increased to time t4 although the common-rail fuel pressure is slightly and temporarily decreased immediately after time t3 by the second cylinder compression stroke injection. The common-rail fuel pressure is kept constant from time t4, and the first cylinder compression stroke injection is performed at time t7. After the common-rail fuel pressure is slightly decreased immediately after time t7 by the first cylinder compression stroke injection, the common-rail fuel pressure is kept constant.

The common-rail fuel pressure is increased again from time t10, and the compression stroke injection is performed at time t12 in the third cylinder. The common-rail fuel pressure is increased to time t13 although the common-rail fuel pressure is slightly and temporarily decreased immediately after time t12 by the third cylinder compression stroke injection. The common-rail fuel pressure is kept substantially constant from time t13, and the fourth cylinder compression stroke injection is performed at time t16. After the common-rail fuel pressure is slightly decreased immediately after time t16 by the fourth cylinder compression stroke injection, the common-rail fuel pressure is kept constant.

When the change in common-rail fuel pressure observed with respect to the plunger lift amount of the high-pressure fuel pump 11 shown in a second row of FIG. 4, the interval between time t1 and time t4 and the interval between time t10 to time t13 correspond to a lift stroke of the plunger lift (the pump plunger 14*b*), and the interval between time t4 and time t10 and the interval between time t13 and time t19 correspond to a lowering stroke of the plunger lift (the pump plunger 14*b*).

In the first embodiment of the present invention, rise timing of an Ref signal of each cylinder is used as the injection start time computation timing in the compression stroke injection. The Ref signal is a signal of a crank angle reference position in each cylinder, which is well know in the art.

In the first cylinder, the injection start time in compression stroke injection (hereinafter referred to as "the compression stroke injection start time") is computed based on an actual common-rail fuel pressure at time t6 which is the injection start time computation timing in compression stroke injection (hereinafter referred to as "compression stroke injection time computation timing"). In the case of the first cylinder, the common-rail fuel pressure at the subsequent fuel injection timing (time t7) in the first cylinder compression stroke injection (hereinafter referred to as "compression stroke injection timing") is substantially the same as the value at time t6. Therefore, no error is generated in the computation of the compression stroke injection start time even if the first cylinder compression stroke injection start time is computed in advance at time t6 just before time t7 which is the first cylinder compression stroke injection timing. Similarly, in the fourth cylinder, the compression stroke injection start time is computed based on the actual common-rail fuel pressure at time t15 which is the compression stroke injection start time computation timing. In the case of the fourth cylinder, the common-rail fuel pressure at the subsequent fuel injection timing (time t16) in the fourth cylinder compression stroke injection is substantially the same as the value at time t15. Therefore, no error is generated in the computation of the compression stroke injection start time even if the fourth cylinder compression stroke injection start time is computed in advance at time t15 just before time t16 which is the fourth cylinder compression stroke injection timing.

On the other hand, in the second cylinder, the compression stroke injection start time computation timing (time t2) and the compression stroke injection timing (time t3) fall within the lift stroke of the plunger lift between time t1 and time t4. If the compression stroke injection start time is computed based on the common-rail fuel pressure at the compression stroke injection start time computation timing (time t2), an error is generated in the computation of the second cylinder compression stroke injection start time at the compression stroke injection timing (time t3) since the common-rail pressure increases by the common-rail fuel pressure increase $\Delta Pcom1$ (first fuel pressure difference) in FIG. 4 from the common-rail fuel pressure at time t2 to the compression stroke injection timing at time t3. Therefore, the fuel is excessively supplied in the second cylinder compression stroke injection. Similarly, in the third cylinder, the compression stroke injection start time computation timing (time t11) and the compression stroke injection timing (time t12) fall within the lift stroke of the plunger lift between time t10 and time t13. If the compression stroke injection start time is computed based on the actual common-rail fuel pressure at the compression stroke injection start time computation timing (time t11), an error is generated in the computation of the third cylinder compression stroke injection start time since the common-rail fuel pressure is increased from the value at time t11 by the fuel pressure increase $\Delta Pcom1$ shown in FIG. 4 at the compression stroke injection timing of time t12. Therefore, the fuel is excessively supplied in the third cylinder compression stroke injection.

Figure 5:
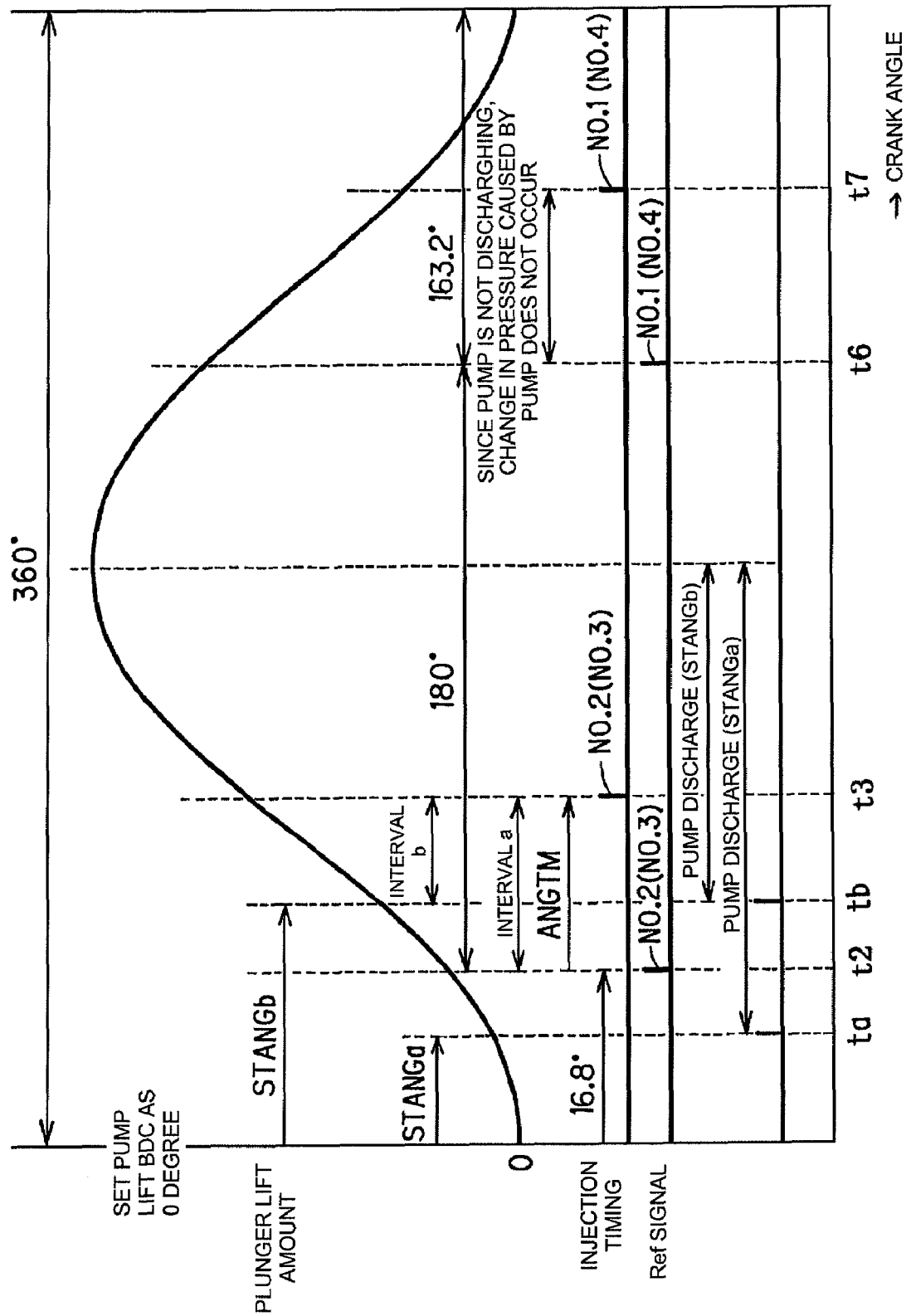
FIG. 5 is a waveform chart for explaining occurrences of injection timings and Ref signals with respect to changes in the plunger lift amount in the high-pressure fuel pump in the engine fuel supply apparatus according to the first embodiment of the present invention.

FIG. 5 shows the plunger lift amount of the plunger pump 14 with respect to a crank angle (horizontal axis). The intake valve camshaft 13 is rotated one turn when the crankshaft is rotated two turns, and the pump drive cam 12 causes to the plunger pump 14 to be lifted twice during one turn of the intake valve camshaft 13. As a result, one period of the plunger lift becomes just 360° in terms of the crank angle. It is assumed that the first cylinder Ref signal rises at time t6 which is located at 163.2° of the crank angle advanced than the position (right end or left end in FIG. 5) where the plunger lift amount of the plunger pump 14 becomes zero. When 1-3-4-2 is the ignition timing of the four-cylinder engine, the second cylinder is followed by the first cylinder, and the second cylinder Ref signal rises at time t1 which is located at 180° of the crank angle before (advanced) the first cylinder Ref signal.

On the other hand, it is assumed that time t7 of the crank angle is the first cylinder compression stroke injection timing which is delayed from the rise (time t6) of the first cylinder Ref signal, and time t3 of the crank angle is the second cylinder compression stroke injection timing which is delayed from the rise (time t2) of the second cylinder Ref signal.

For the third cylinder and the fourth cylinder, the third cylinder and fourth cylinder Ref signals are located at positions of the second cylinder and first cylinder Ref signals in FIG. 5 at the position where the plunger lift is shifted by 360° toward the advance angle side, and the third cylinder injection timing and fourth cylinder injection timing are located at positions of time t3 and time t7 of the crank angle which are delayed from the rises of the second cylinder and first cylinder Ref signals. Therefore, the Ref signal and the compression stroke injection timing for the third and fourth cylinders are shown in FIG. 5 with parentheses.

Referring to FIG. 5, in the cylinders in which the rise timing of the Ref signal and compression stroke injection timing occur during the lift stroke of the plunger lift, i.e., in the second and third cylinders, the common-rail fuel pressure at the second or third cylinder compression stroke injection timing (time t3) is increased by the difference in the common-rail fuel pressure between at the rise timing (time t2) of the second or third cylinder Ref signal and the second or third cylinder compression stroke injection timing (time t3). Assume that the fuel pressure correction coefficient KINJ is computed based on the common-rail fuel pressure at time t2, the fuel pressure correction coefficient KINJ is multiplied by the basic injection pulse width Tp to compute the fuel injection pulse width Ti given to the second and third cylinder fuel injection valves 31B and 31C in the compression stroke injections, and if the second and the third cylinder compression stroke injection start times are computed based on the fuel injection pulse width Ti and the engine revolution speed. In such case, the fuel consumption is worsened because the fuel injection amount becomes excessive by the common-rail fuel pressure increase $\Delta Pcom1$ between the second or third cylinder compression stroke injection start time computation timing (time t2) and the second or third cylinder compression stroke injection timing (time t3) in the second and third cylinder compression stroke injections.

Therefore, in the present invention, for the cylinders in which the Ref signal rise timing and the compression stroke injection timing occur during the lift stroke of the plunger lift (i.e., second cylinder and third cylinder), the common-rail fuel pressure increase $\Delta Pcom1$ between the compression stroke injection start time computation timing and the compression stroke injection timing, which occurs after the compression stroke injection start time computation timing, is computed at the compression stroke injection start time computation timing. A value obtained by adding the common-rail fuel pressure increase $\Delta Pcom1$ to the actual common-rail fuel pressure Pf (or a weighted average value AVEPF of the common-rail fuel pressure) at the compression stroke injection start time computation timing is computed as a common-rail fuel pressure estimate value Pcom_y1 (first fuel pressure estimate value) at the compression stroke injection timing. A second or third cylinder fuel pressure correction coefficient KINJ2 or KINJ3 is computed based on the common-rail fuel pressure estimate value Pcom_y1 for the compression stroke injection timing, and the second or third cylinder fuel pressure correction coefficient KINJ2 or KINJ3 is multiplied by the basic injection pulse width Tp to compute a fuel injection pulse width Ti2 or Ti3 in the second or third cylinder compression stroke injection. Then, second or third cylinder compression stroke injection start time ITst2 or ITst3 is computed based on the computed fuel injection pulse width Ti2 or Ti23 and the engine revolution speed Ne at the compression stroke injection start time computation timing.

On the other hand, in the cylinders in which the Ref signal rise timing and the compression stroke injection timing occur during the lowering stroke of the plunger lift, i.e., in the first and fourth cylinders, the common-rail fuel pressure at the rise timing (time t6) of the first or fourth cylinder Ref signal is equal to the common-rail fuel pressure at the first or fourth cylinder compression stroke injection timing (time t7). Accordingly, in the first and fourth cylinders, a fuel pressure correction coefficient KINJ can be computed based on the common-rail fuel pressure at time t6 to compute the fuel injection pulse width Ti at time t7 in the compression stroke injection. This is because there is no increase in the common-rail fuel pressure between the compression stroke injection start time computation timing (time t6) and the compression stroke injection timing (time t7) for the first and fourth cylinders.

Therefore, in the present invention, the common-rail fuel pressure is not corrected according to the common-rail fuel pressure increase with respect to the cylinder in which the Ref signal rise timing and the compression stroke injection timing occur during the lowering stroke of the plunger lift. More specifically, for the first and fourth cylinders, the compression stroke injection start time is computed in the same manner as a conventional example.

Figure 18:
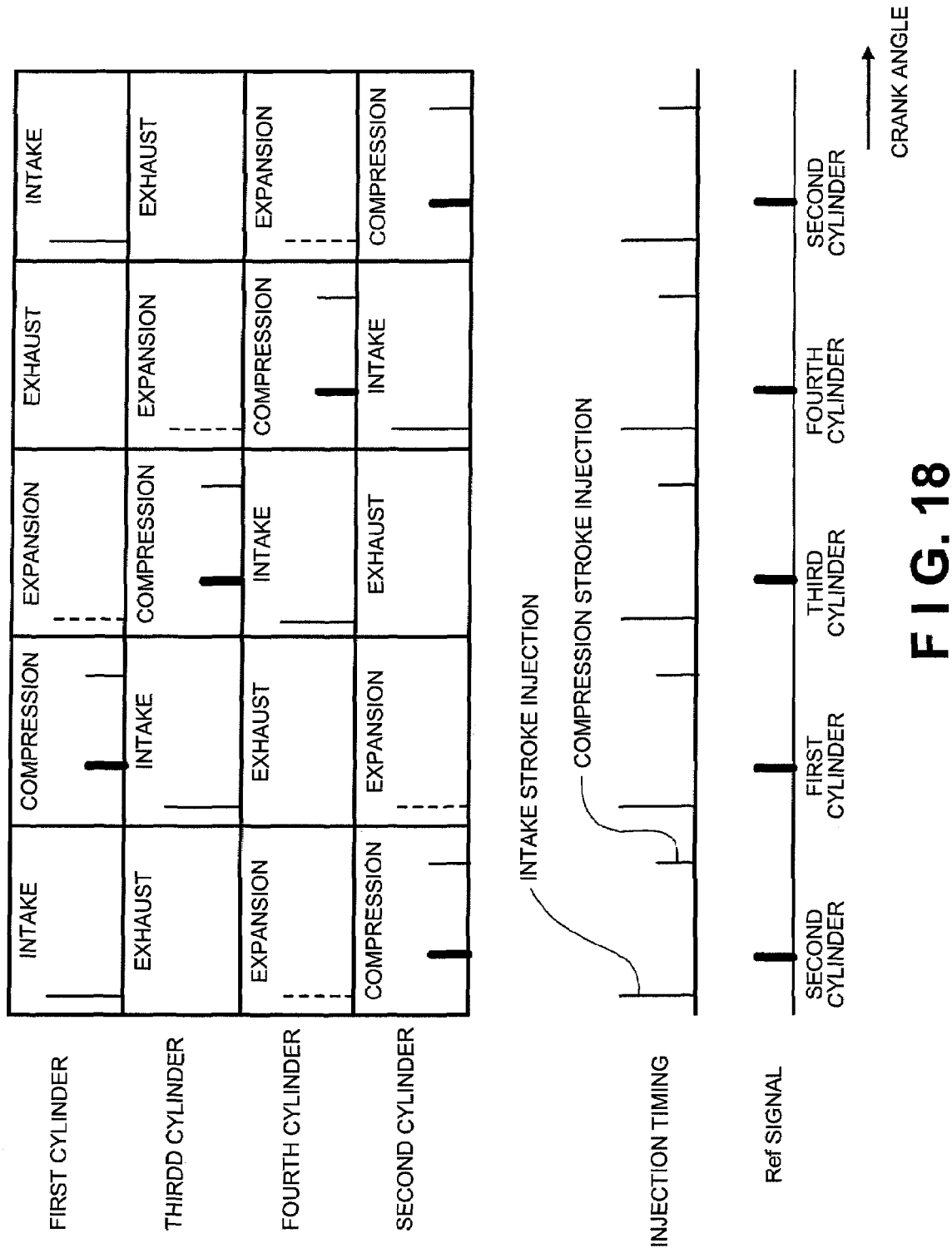
FIG. 18 a diagrammatic chart for explaining relationships between strokes of each cylinder, injection timings, and Ref signals according to the first embodiment of the present invention.

Referring now to FIG. 18, the intake stroke injection performed for a cylinder in which an intake stroke occurs between two continuous compression stroke injections will be described. FIG. 18 shows strokes of each cylinder. In FIG. 18, the compression stroke injection timing is indicated by a short line located in each rear portion of the second cylinder, the first cylinder, the third cylinder, and the fourth cylinder compression stroke, and the fuel injection timing in the intake stroke injection (hereinafter referred to as "intake stroke injection timing") is indicated by a long line located in each front portion of the third cylinder, the fourth cylinder, the second cylinder, and the first cylinder intake stroke. That is, according to ignition timings of the cylinders, the third cylinder intake stroke injection is performed between the second cylinder compression stroke injection and the first cylinder compression stroke injection, the fourth cylinder intake stroke injection is performed between the first cylinder compression stroke injection and the third cylinder compression stroke injection, the second cylinder intake stroke injection is performed between the third cylinder compression stroke injection and the fourth cylinder compression stroke injection, and the first cylinder intake stroke injection is performed between the fourth cylinder compression stroke injection and the second cylinder compression stroke injection. Thus, the intake stroke injection is added, and the fuel injection is performed to one cylinder in both the compression stroke and the intake stroke immediately before the compression stroke. In other words, the fuel injection is performed to one cylinder in a multi-stage manner, which allows an application range of the fuel injection to be widened.

The present invention is not limited to the combination of the compression stroke injection and the intake stroke injection. For example, a compression stroke injection and an expansion stroke injection may be performed to one cylinder in an alternative embodiment. For example, the expansion stroke injection timing is indicated by a long broken line of FIG. 18. That is, according to the ignition timing of the cylinders, the second cylinder expansion stroke injection can be performed between the second cylinder compression stroke injection and the first cylinder compression stroke injection, the first cylinder expansion stroke injection can be performed between the first cylinder compression stroke injection and the third cylinder compression stroke injection, the third cylinder expansion stroke injection can be performed between the third cylinder compression stroke injection and the fourth cylinder compression stroke injection, and the fourth cylinder expansion stroke injection can be performed between the fourth cylinder compression stroke injection and the second cylinder compression stroke injection. Thus, the expansion stroke injection is added, and the fuel injection is performed to one cylinder in both the compression stroke and the expansion stroke immediately after the compression stroke. In other words, the fuel injection is performed to one cylinder in the multi-stage manner. Consequently, so-called after-burning can be generated by the expansion stroke injection to early activate a catalyst provided in an exhaust passage of the engine.

Referring back to FIG. 4, the waveform chart illustrated in FIG. 4 also shows the intake stroke injections. More specifically, the compression stroke injection timing is indicated by the short line, and the intake stroke injection timing is indicated by the long line in the third row of FIG. 4.

As described above, the common-rail fuel pressure estimate value Pcom_y1 at the second cylinder compression stroke injection timing is computed at the second cylinder compression stroke injection start time computation timing (time t2). Moreover, a common-rail fuel pressure estimate value Pcom_y2 at a third cylinder intake stroke injection timing (time t5) is computed at the same second cylinder compression stroke injection start time computation timing (time t2). The common-rail fuel pressure is increased during the interval between time t2 and time t4, and the common-rail fuel pressure is decreased at time t3 due to the second cylinder compression stroke injection. Therefore, the common-rail fuel pressure estimate value Pcom_y2 can be computed at the third cylinder intake stroke injection timing (time t5) by adding a common-rail fuel pressure increase ΔPcom2 between time t2 and time t4 at time t2 while subtracting a common-rail fuel pressure decrease ΔPinj1 caused by the second cylinder compression stroke injection from the common-rail fuel pressure at time t2. The value obtained by subtracting a common-rail fuel pressure decrease ΔPinj1 from the projected pressure increase between time t2 and time t4 corresponds to the second fuel pressure difference in the present invention. More specifically, the common-rail fuel pressure increase ΔPcom2 by the third cylinder intake stroke injection timing (time t5), which occurs after the compression injection start time computation timing (time t2), and the common-rail fuel pressure decrease ΔPinj1 caused by the second cylinder compression stroke injection are computed at the second cylinder compression stroke injection start time computation timing (time t2). Then, the common-rail fuel pressure decrease ΔPinj1 caused by the second cylinder compression stroke injection is subtracted from a value obtained by adding the common-rail fuel pressure increase ΔPcom2 to the actual common-rail fuel pressure Pf (or the weighted average value AVEPF thereof) at the second cylinder compression stroke injection start time computation timing (time t2). The obtained value serves as the common-rail fuel pressure estimate value Pcom_y2 (second fuel pressure estimate value) at the third cylinder intake stroke injection timing. Then, a third cylinder fuel pressure correction coefficient KINJ3 is computed based on the common-rail fuel pressure estimate value Pcom_y2 at the intake stroke injection timing, and the third cylinder fuel pressure correction coefficient KINJ3 is multiplied by the basic injection pulse width Tp to compute a fuel injection pulse width Ti3 in the third cylinder intake stroke injection. An injection start time in the third cylinder intake stroke injection (hereinafter referred to as "intake stroke injection start time") ITst3 is computed based on the computed fuel injection pulse width Ti3 in the intake stroke injection and an engine revolution speed Ne at that time.

Similarly, a common-rail fuel pressure increase ΔPcom2 by the second cylinder intake stroke injection timing (time t14), which occurs after the compression stroke injection start time computation timing (time t11), and a common-rail fuel pressure decrease ΔPinj1 caused by the third cylinder compression stroke injection are computed at the third cylinder compression stroke injection start time computation timing (time t11). The common-rail fuel pressure decrease ΔPinj1 caused by the third cylinder compression stroke injection is subtracted from a value obtained by adding the common-rail fuel pressure increase ΔPcom2 to an actual common-rail fuel pressure Pf (or the weighted average value AVEPF thereof) at the third cylinder compression stroke injection start time computation timing (time t11). The obtained value serves as the common-rail fuel pressure estimate value Pcom_y2 (second fuel pressure estimate value) at the second cylinder intake stroke injection timing. A second cylinder fuel pressure correction coefficient KINJ2 is computed based on the common-rail fuel pressure estimate value Pcom_y2 at the intake stroke injection timing, and the second cylinder fuel pressure correction coefficient KINJ2 is multiplied by the basic injection pulse width Tp to compute a fuel injection pulse width Ti2 in the second cylinder intake stroke injection. Then, a second cylinder intake stroke injection start time ITst2 is computed based on the computed fuel injection pulse width Ti2 in the intake stroke injection and the engine revolution speed Ne at that time.

A common-rail fuel pressure estimate value Pcom_y3 at the fourth cylinder intake stroke injection timing (time t9) is computed at the first cylinder compression stroke injection start time computation timing (t6). The common-rail fuel pressure is not increased during the interval between time t6 and time t9, and the common-rail fuel pressure is decreased at a time t7 by the first cylinder compression stroke injection. For this reason, a common-rail fuel pressure estimate value Pcom_y3 can be computed at fourth cylinder intake stroke injection timing (time t9) by subtracting the common-rail fuel pressure decrease ΔPinj2 caused by the first cylinder compression stroke injection from the common-rail fuel pressure at time t6. That is, a common-rail fuel pressure decrease ΔPinj2 caused by the first cylinder compression stroke injection is computed at the first cylinder compression stroke injection start time computation timing (time t6). The common-rail fuel pressure decrease ΔPinj2 caused by the first cylinder compression stroke injection is subtracted from the actual common-rail fuel pressure Pf (or the weighted average value AVEPF thereof) at the first cylinder compression stroke injection start time computation timing (time t6). The obtained value serves as the common-rail fuel pressure estimate value Pcom_y3 at the fourth cylinder intake stroke injection timing (time t9). A fourth cylinder fuel pressure correction coefficient KINJ4 is computed based on the common-rail fuel pressure estimate value Pcom_y3 at the intake stroke injection timing, and the fourth cylinder fuel pressure correction coefficient KINJ4 is multiplied by the basic injection pulse width Tp to compute a fuel injection pulse width Ti4 in the fourth cylinder intake stroke injection. Then, a fourth cylinder intake stroke injection start time ITst4 is computed based on the fuel injection pulse width Ti4 in the computed intake stroke injection and an engine revolution speed Ne at that time.

Similarly, a common-rail fuel pressure decrease ΔPinj2 caused by the fourth cylinder compression stroke injection is computed at fourth cylinder compression stroke injection start time computation timing (time t15). The common-rail fuel pressure decrease ΔPinj2 caused by the fourth cylinder compression stroke injection is subtracted from an actual common-rail fuel pressure Pf (or the weighted average value AVEPF thereof) at the fourth cylinder compression stroke injection start time computation timing (time t15). The obtained value serves as a common-rail fuel pressure estimate value Pcom_y3 at the first cylinder intake stroke injection timing (time 19). A first cylinder fuel pressure correction coefficient KINJ1 is computed based on the common-rail fuel pressure estimate value Pcom_y3 at the intake stroke injection timing, and the first cylinder fuel pressure correction coefficient KINJ1 is multiplied by the basic injection pulse width Tp to compute a fuel injection pulse width Ti1 in the first cylinder intake stroke injection. Then, a first cylinder intake stroke injection start time ITst1 is computed based on the computed fuel injection pulse width Ti1 in the intake stroke injection and an engine revolution speed Ne at that time.

The control performed by the engine controller 41 will be described in detail with reference to a flowchart of FIG. 6.

Figure 6:
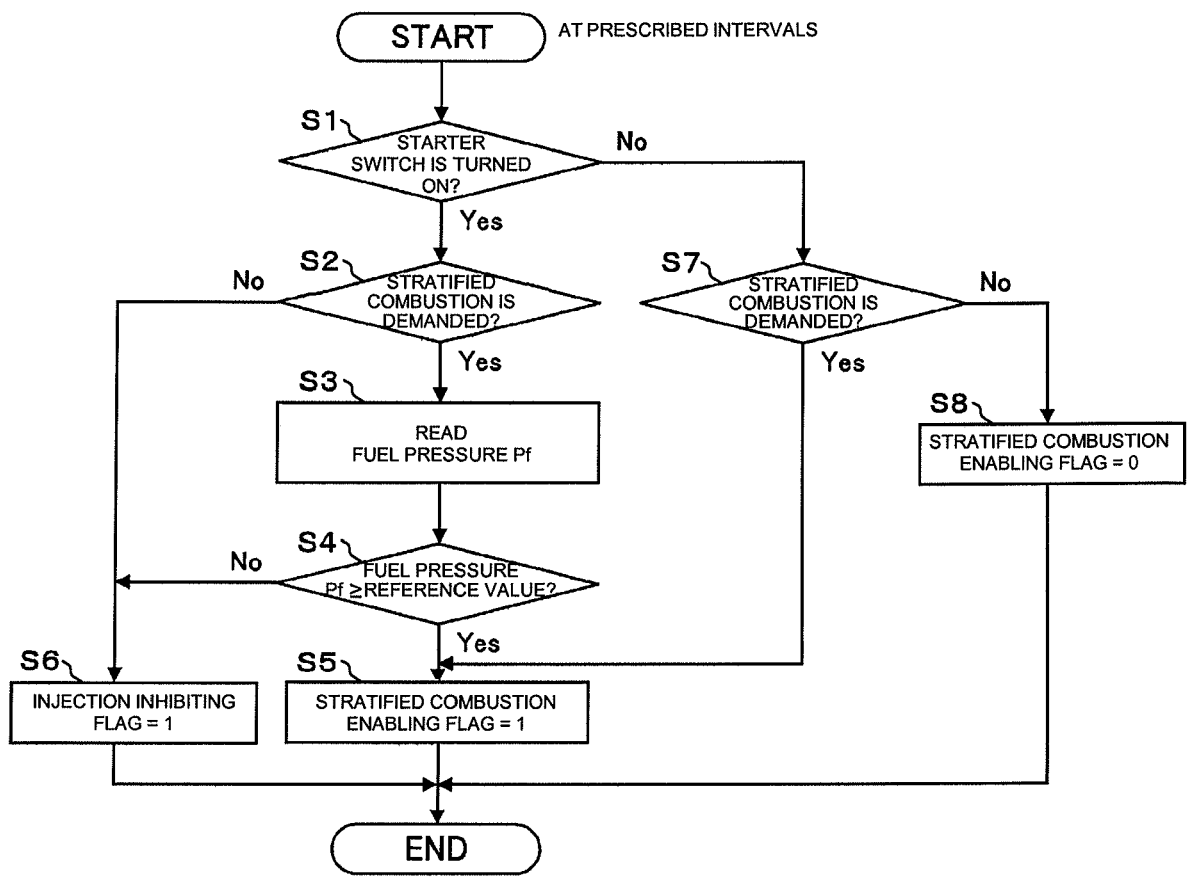
FIG. 6 is a flowchart for explaining a control process for setting a stratified combustion enabling flag executed in the engine fuel supply apparatus according to the first embodiment of the present invention.

FIG. 6 is a flowchart showing setting of a stratified combustion enabling flag. The stratified combustion enabling flag is set according to the flowchart of FIG. 6 at constant time intervals (for example, in each 10 msec).

In step S1, the engine controller 41 is configured to check a signal from a starter switch 45. When the engine controller 41 receives the on signal from the starter switch 45, the engine controller 41 is configured to determine that the engine is started up, and the control process proceeds to step S2.

In step S2, the engine controller 41 is configured to determine whether or not a demand of the stratified combustion exists. An operating region, in which an engine revolution speed and an engine load are set as parameters, is generally divided into a stratified combustion region where the stratified combustion is performed on a low-load side, and a homogenous combustion region where homogenous combustion is performed on a high-load side. On the low-load side where large engine output is not required, the stratified combustion is performed to improve the fuel consumption by the compression stroke injection. On the other hand, on the high-load side where the large engine output is required, the combustion state is switched from the stratified combustion to the so-called homogeneous combustion. In the homogeneous combustion, the intake stroke injection is performed, the fuel vaporization is sufficiently promoted in the whole combustion chamber before the combustion, and the fuel is combusted. For this reason, the stratified combustion is demanded when the operating condition determined by the engine revolution speed and engine load exists in the stratified combustion region, and the stratified combustion is not demanded when the operating condition determined by the engine revolution speed and engine load exists in the homogeneous combustion region.

In the first embodiment, even in the engine cranking where the starter switch 45 is turned on, the stratified combustion is performed by the compression stroke injection. Therefore, when the starter switch 45 is turned on, the engine controller 41 is configured to determine that the stratified combustion is demanded, and the control process proceeds to step S3.

In step S3, the engine controller 41 is configured to read an actual common-rail fuel pressure Pf detected by the common-rail fuel pressure sensor 42.

In step S4, the engine controller 41 is configured to compare the actual common-rail fuel pressure Pf to a reference value.

The reference value used in step S4 is preferably set to a stratified combustion enabling fuel pressure (a common-rail fuel pressure enabling the stratified combustion). A fuel quantity per one cylinder and one cycle supplied from the fuel injection valve is determined by the common-rail fuel pressure and the fuel injection pulse width. In such case, the minimum fuel quantity necessary to stably rotate the engine by the stratified combustion and the minimum fuel injection pulse width in which valve opening accuracy is compensated are set in advance. Therefore, the minimum value of the common-rail fuel pressure necessary to stably rotate the engine by the stratified combustion is determined based on the minimum fuel quantity and the minimum fuel injection pulse width. The reference value is the minimum value of the common-rail fuel pressure necessary to stably rotate the engine by the stratified combustion. Specifically, the reference value is set to about 2 MPa. Accordingly, when the actual common-rail fuel pressure Pf is not lower than the reference value in step S4, the engine controller 41 is configured to determine that the stratified combustion can be performed with the common-rail fuel pressure, and the control process proceeds to step S5.

In step S5, the engine controller 41 is configured to set a value of the stratified combustion enabling flag (initial value thereof is set to zero) to 1.

On the other hand, when the actual common-rail fuel pressure Pf is lower than the reference value in step S4, the engine controller 41 is configured to determine that the common-rail fuel pressure does not reach the pressure with which the stratified combustion can be performed, and the control process proceeds to step S6.

In step S6, the engine controller 41 is configured to set a value of an injection inhibiting flag (initial value thereof is set to zero) to 1.

When in step S2, the stratified combustion is not demanded, the control process proceeds to step S6, in which the injection inhibiting flag is set to 1.

When the starter switch 45 is turned off (provided that the ignition switch is turned on) in step S1, the control process proceeds to step S7. The processes on and after step S7 performed after the engine is started up.

In step S7, the engine controller 41 is configured to check whether or not the stratified combustion is demanded. As described above, the stratified combustion is demanded when the operating condition determined by the engine revolution speed and engine load falls within the stratified combustion region. On the other hand, the stratified combustion is not demanded when the operating condition determined by the engine revolution speed and engine load falls within the homogeneous combustion region. Therefore, when the stratified combustion is demanded in step S7, the control process proceeds to step S5, in which the stratified combustion enabling flag is set to 1. When the stratified combustion is not demanded, the control process proceeds to step S8, in which the stratified combustion enabling flag is set to zero.

Figure 7:
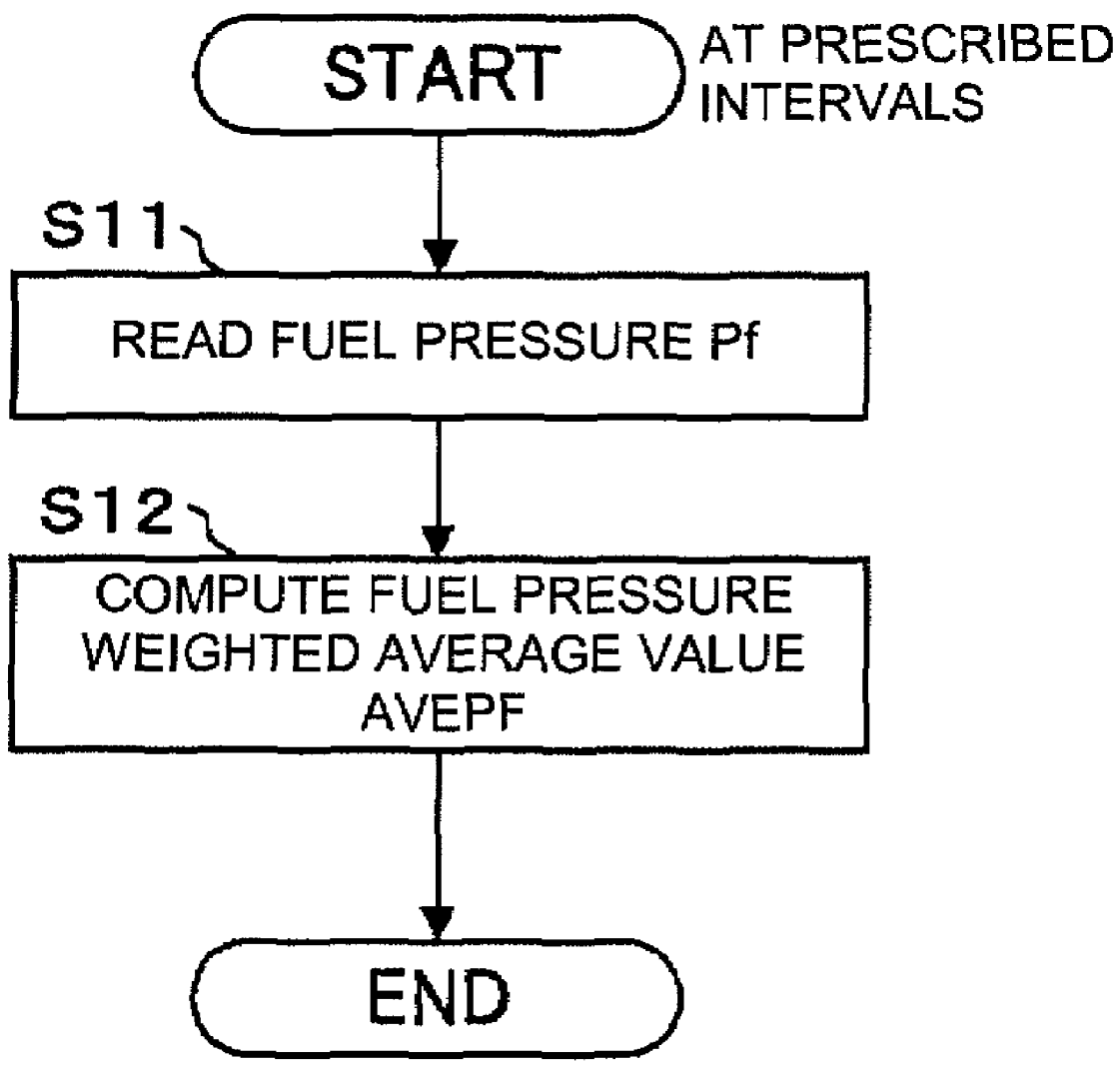
FIG. 7 is a flowchart for explaining a control process for computing a common-rail fuel pressure weighted average value executed in the engine fuel supply apparatus according to the first embodiment of the present invention.

FIG. 7 is a flowchart showing computation of a common-rail fuel pressure weighted average value AVEPF of the common-rail fuel pressure executed in the engine controller 41. The weighted average value AVEPF is computed according to the flowchart of FIG. 7 at constant time intervals (for example, in each 2 msec).

In step S11, the engine controller 41 is configured to read the common-rail fuel pressure Pf detected by the fuel pressure sensor 42.

In step S12, the engine controller 41 is configured to compute the weighted average value AVEPF of the common-rail fuel pressure using the following formula (1).

$$AVEPF=Pf \times WAC + AVEPF(\text{previous value}) \times (1-WAC) \qquad (1)$$

In the formula (1) above, the value AVEPF(previous value) denotes a previous value of AVEPF that is computed in the previous control cycle, and the value WAC donates a weighted average coefficient.

Figure 12A:
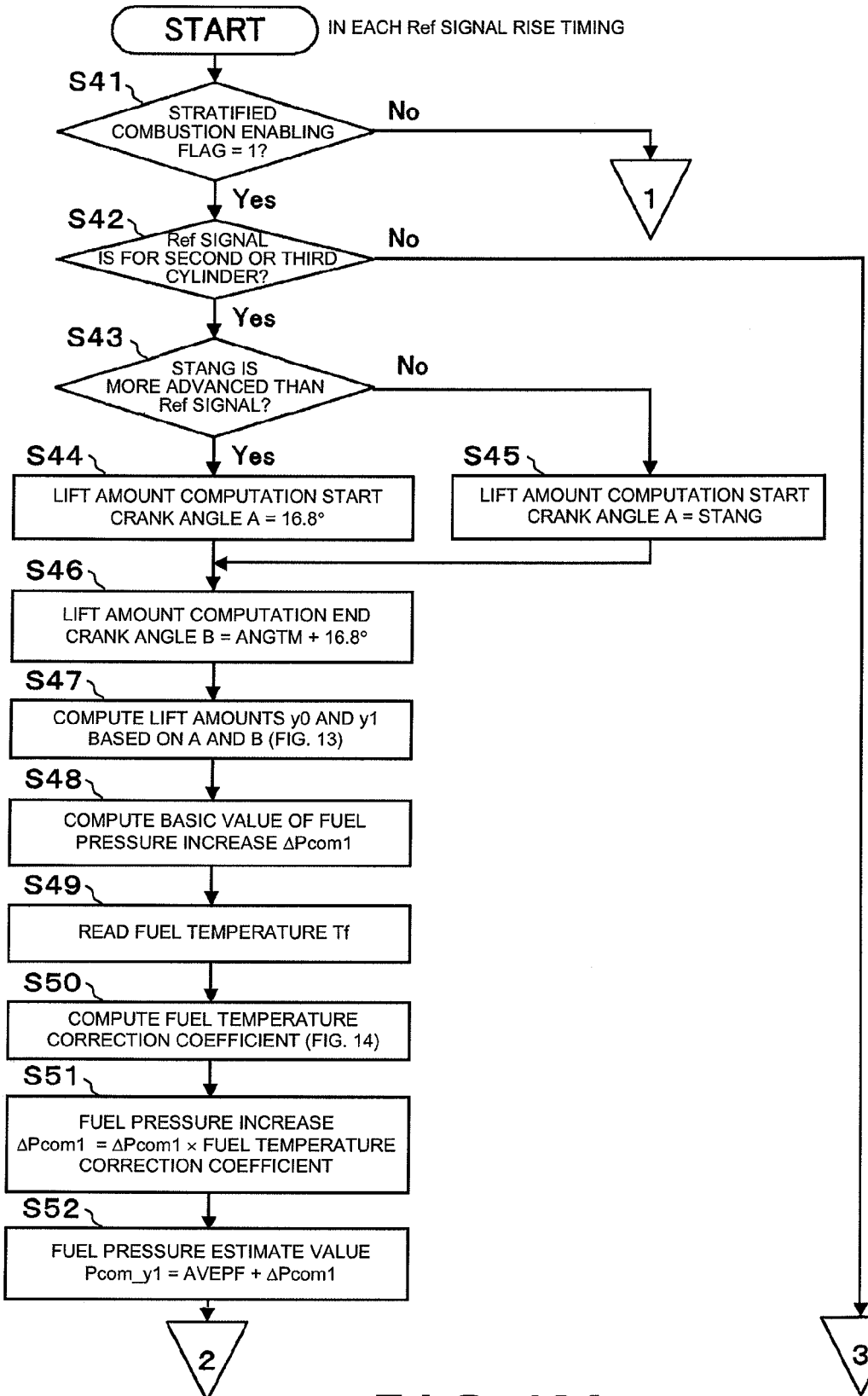
FIGS. 12A and 12B illustrate a flowchart for explaining a control process for computing a compression stroke injection start time and an intake stroke injection start time executed in the engine fuel supply apparatus according to the first embodiment of the present invention.
Figure 12B:
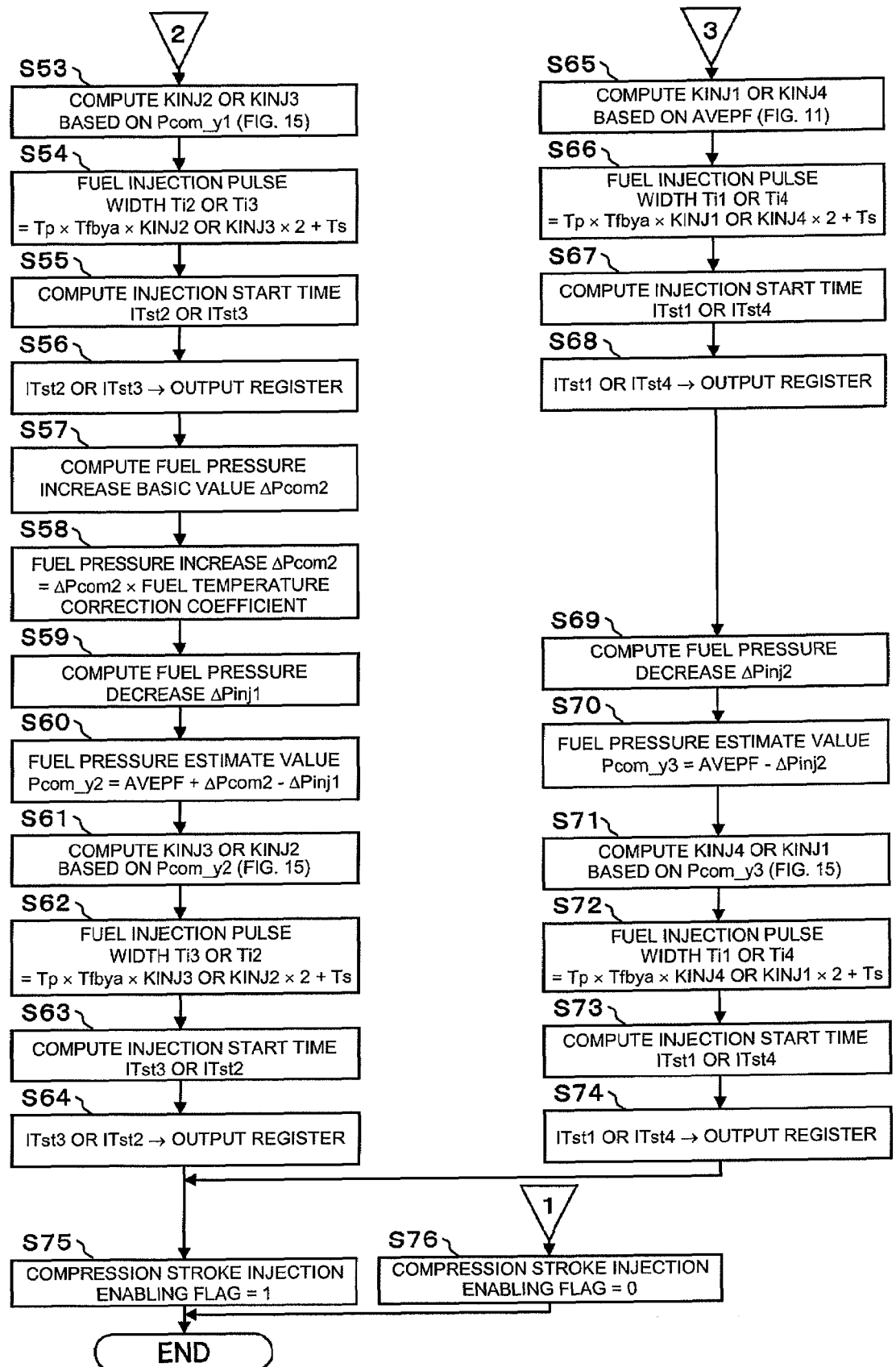

The common-rail fuel pressure weighted average value AVEPF computed by the formula (1) is used to compute the common-rail fuel pressure estimate value Pcom_y1 in step S52 of FIG. 12A, to compute the common-rail fuel pressure estimate value Pcom_y2 in step S60 of FIG. 12B, to compute the common-rail fuel pressure estimate value Pcom_y3 in step S70 of FIG. 12B, and to compute the first or fourth cylinder fuel pressure correction coefficient KINJ1·4 in step S65 of FIG. 12B.

Figure 8:
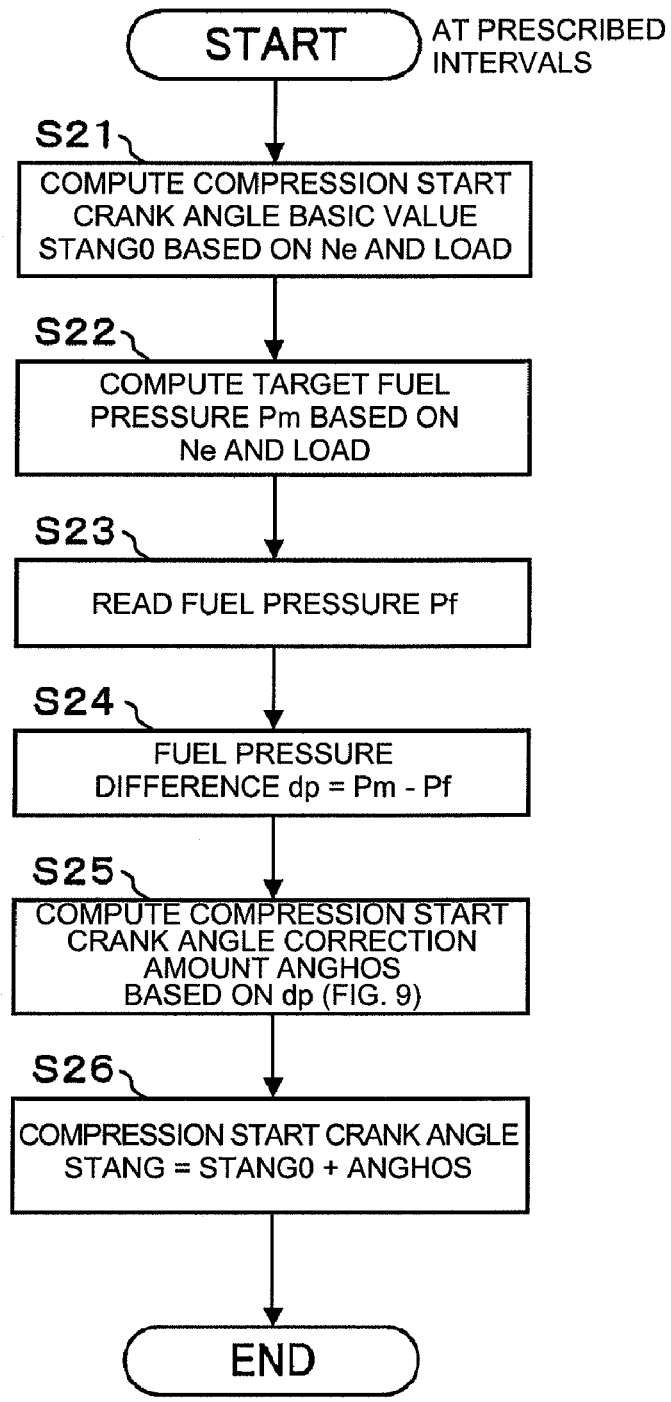
FIG. 8 is a flowchart for explaining a control process for computing a compression start crank angle executed in the engine fuel supply apparatus according to the first embodiment of the present invention.

FIG. 8 is a flowchart showing computation of a compression start crank angle STANG of the plunger pump 14 executed in the engine controller 41. The compression start crank angle STANG is computed according to the flowchart of FIG. 8 at constant time intervals (for example, in each 10 msec).

In step S21, the engine controller 41 is configured to compute a compression start crank angle basic value STANG0 (°) of the plunger pump 14 by searching a predetermined map based on the engine revolution speed Ne and the engine load. The compression start crank angle basic value STANG0 is determined such that a target fuel pressure is obtained.

The compression start crank angle basic value STANG0 (and later-mentioned compression start crank angle STANG) is a crank angle interval between the position where the plunger lift amount of the plunger pump 14 becomes zero and the position where the compression is started in the plunger pump 14 (see STANG in the second stage of FIG. 4).

In step S22, the engine controller 41 is configured to compute a target fuel pressure Pm by searching a predetermined map based on the engine revolution speed Ne and the engine load. Basically, the target fuel pressure Pm is increased as the engine load is increased, and the target fuel pressure Pm is increased as the engine revolution speed Ne is enhanced.

In step S23, the engine controller 41 is configured to read an actual common-rail fuel pressure Pf (Pa) detected by the fuel pressure sensor 42.

In step S24, the engine controller 41 is configured to compute a difference dp (=Pm−Pf) between the target fuel pressure Pm and the actual common-rail fuel pressure Pf.

In step S25, the engine controller 41 is configured to compute a compression start crank angle correction amount ANGHOS (°) by searching a table such as one shown in FIG. 9 based on the fuel pressure difference dp (Pa).

In step S26, the engine controller 41 is configured to compute a value obtained by adding the compression start crank angle correction amount ANGHOS to the compression start crank angle basic value STANG0 (subtraction is actually performed) as the compression start crank angle STANG (°) of the plunger pump 14.

As shown in FIG. 9, the compression start crank angle correction amount ANGHOS becomes zero when the fuel pressure difference dp is zero. The compression start crank angle correction amount ANGHOS becomes a negative value when the fuel pressure difference dp has a positive value, while maintained at zero when the fuel pressure difference dp has a negative value. The reason why the compression start crank angle correction amount ANGHOS becomes a negative value when the fuel pressure difference dp has a positive value is as follows. When the fuel pressure difference dp has a positive value, i.e., when the actual common-rail fuel pressure Pf is lower than the target fuel pressure Pm, it is necessary that the actual common-rail fuel pressure Pf be increased to the target fuel pressure Pm. To that end, the compression start crank angle of the plunger pump 14 is decreased, i.e., the negative value is given to the compression start crank angle correction amount ANGHOS, and the compression start timing is advanced to increase the pump discharge quantity, which increases the common-rail fuel pressure to the target fuel pressure.

In accordance with a prescribed control flow (not shown), the engine controller 41 is configured to control the control solenoid 17 such that the compression start crank angle STANG of the plunger pump 14 is obtained.

The compression start crank angle STANG is used to compute a lift amount computation start crank angle A in steps S43 and S45 of FIG. 12A.

The present invention is not limited to the above method of computing the compression start crank angle STANG. In the first embodiment, the compression start crank angle STANG is computed in consideration of the fuel pressure difference dp between the target and actual fuel pressures. However, the compression start crank angle STANG may be computed without considering the fuel pressure difference dp from the target fuel pressure.

Additionally, a well-known method of obtaining the compression start crank angle STANG may also be adopted (for example, see Japanese Laid-Open Patent Application Publication No. 2003-106208) in the present invention. In this well-known method, a conventional compression start crank angle STANG' is computed by the following supplemental formula (1').

$$STANG' = REFANG - PUMRE \quad (1')$$

In the supplemental formula (1') above, the value REFANG denotes a reference angle, and the value PUMRE denotes a pump retard angle. In the supplemental formula (1'), the reference angle REFANG is a value which is transferred onto the advance angle side in order to increase the pump discharge quantity to return the actual common-rail fuel pressure to the target fuel pressure when the actual common-rail fuel pressure is lower than the target fuel pressure. In the supplemental formula (1'), the pump retard angle PUMRE is a value which is decreased as a battery voltage VB is increased.

The conventional compression start crank angle STANG' calculated in the supplemental formula (1') is originated from a Ref signal input (rise) timing, and thus has the following relationship with the compression start crank angle STANG of the first embodiment which is originated from the position where the plunger lift amount of the plunger pump 14 becomes zero.

$$STANG' = STANG \text{ of first embodiment} + 163.2° \quad (2')$$

Accordingly, if the well-known method is adopted, it is necessary that the conventional compression start crank angle STANG' be converted into the compression start crank angle STANG of the first embodiment using the supplemental formula (2').

Figure 10:
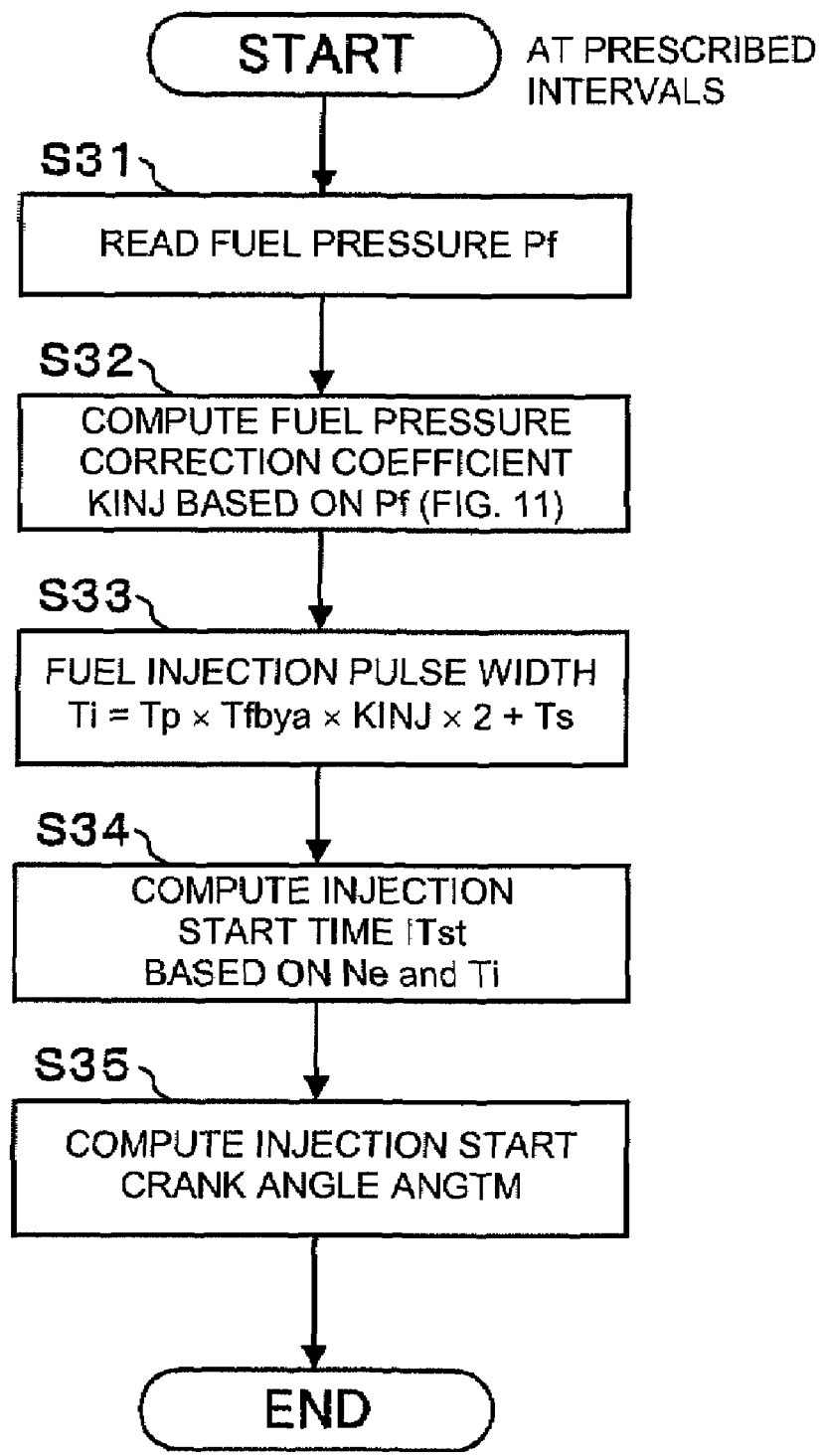
FIG. 10 is a flowchart for explaining a control process for computing an injection start crank angle executed in the engine fuel supply apparatus according to the first embodiment of the present invention.

FIG. 10 is a flowchart showing computation of an injection start crank angle ANGTM executed in the engine controller 41. The injection start crank angle ANGTM is computed according to the flowchart of FIG. 10 at constant time intervals (for example, in each 10 msec).

In step S31, the engine controller 41 is configured to read an actual common-rail fuel pressure Pf detected by the fuel pressure sensor 42.

In step S32, the engine controller 41 is configured to compute a fuel pressure correction coefficient KINJ by searching a table such as one shown in FIG. 11 based on the common-rail fuel pressure Pf.

In step S33, the engine controller 41 is configured to compute a fuel injection pulse width Ti (msec) given to the fuel injection valve in the compression stroke injection using the fuel pressure correction coefficient KINJ according to the following formula (2).

$$Ti = Tp \times Tfbya \times KINJ \times 2 + Ts \quad (2)$$

In the formula (2) above, the value Tp denotes a basic injection pulse width, the value Tfbya denotes a target equivalence ratio, and the value Ts denotes a solid injection pulse width. The basic injection pulse width Tp (msec) of the formula (2) is a value determined by a cylinder intake air quantity Qcy1 and an engine revolution speed Ne (=K×Qcy1/Ne), and an air fuel mixture having a substantially theoretical air fuel ratio is obtained by the basic injection pulse width Tp. The cylinder intake air quantity Qcy1 is computed based on an intake air quantity Qa detected by the air flow sensor 46 by a well-known method.

The target equivalence ratio Tfbya (absolute number) of the formula (2) becomes 1.0 in a stoichiometric operating area of the homogeneous combustion region or the stratified combustion region. In a lean air fuel ratio area of the homogeneous combustion region, the target equivalence ratio Tfbya becomes a positive value smaller than 1.0, and a so-called lean combustion is performed.

The solid injection pulse width Ts (msec) of the formula (2) is a value corresponding to the battery voltage.

The basic injection pulse width Tp, the target equivalence ratio Tfbya, and the solid injection pulse width Ts are computed in a background job (not shown).

In step S34, the engine controller 41 is configured to convert the fuel injection pulse width Ti in the compression stroke injection into a crank angle (°) using an engine revolution speed Ne at that time. Then, the engine controller 41 is configured to compute a crank angle, which is more advanced than an injection end time ITend1 (°BTDC) in the compression stroke injection by an amount of the converted crank angle, as a compression stroke injection start time ITst (°BTDC). The injection end time ITend1 in the compression stroke injection is a crank angle which is measured from compression top dead center of each cylinder toward the advance side, and is a fixed value. Therefore, the compression stroke injection start time ITst also is a crank angle that is measured from the compression top dead center of each cylinder toward the advance side.

In step S35, the engine controller 41 is configured to compute an injection start crank angle ANGTM (°), which is a crank angle between the Ref signal rise timing and the compression stroke injection start time ITst, based on the compression stroke injection start time ITst. The injection start crank angle ANGTM to be determined is a crank angle interval between the Ref signal rise timing and the compression stroke injection start time ITst for each cylinder.

FIG. 4 shows the injection start crank angle ANGTM of the representative third cylinder. In FIG. 4, for example, the Ref signal rise timing of each cylinder is previously determined at 110° before the compression top dead point according to engine specifications. Therefore, in this example, a value obtained by subtracting the compression stroke injection start time ITSt (°BTDC) from 110° BTDC of the Ref signal rise timing can be determined as the injection start crank angle ANGTM (°).

The injection start crank angle ANGTM is used to compute a lift amount computation end crank angle B in step S46 of FIG. 12A.

FIGS. 12A and 12B illustrate a flowchart for computing the compression stroke injection start time (compression stroke injection time) and the intake stroke injection start time (intake stroke injection time) executed in the engine controller 41. The computations according to the flowchart of FIGS. 12A and 12B are performed in each time of the Ref signal rise timing of each cylinder. The Ref signal is a signal of the crank angle reference position for each cylinder, which is computed from a signal from the crankshaft position sensor 43 and a signal from the camshaft position sensor 44.

In step S41, the engine controller 41 is configured to check whether or not the stratified combustion enabling flag determined in the flowchart shown in FIG. 6 is set to zero. When the stratified combustion enabling flag is set to zero, the compression stroke injection should not be permitted, and therefore, the control process proceeds to step S76 of FIG. 12B. In step S76, the compression stroke injection enabling flag is set to zero.

When the stratified combustion enabling flag is set to 1 in step S41, the control process proceeds to step S42. In step S42, the engine controller 41 is configured to determine whether or not the current Ref signal rise timing is for the second or third cylinder. When the current Ref signal rise timing is for the second or third cylinder, the engine controller 41 is configured to determine that the common-rail fuel pressure will be increased from a current timing to a compression stroke injection timing which comes immediately after the current timing. Thus, the control process proceeds to steps S43 to S51.

In steps S43 to S51, the engine controller 41 is configured to compute a common-rail fuel pressure increase ΔPcom1 (Pa) which is the pressure increase between the current timing and the compression stroke injection timing. Then, in step S52, the engine controller 41 is configured to compute a value obtained by adding the common-rail fuel pressure increase ΔPcom1 (Pa) to the common-rail fuel pressure weighted average value AVEPF at the current timing as a common-rail fuel pressure estimate value Pcom_y1 (Pa) at the second or third cylinder compression stroke injection timing.

More specifically, in step S43, the engine controller 41 is configured to check whether or not the compression start crank angle STANG computed in the flowchart shown in FIG. 8 is located on the advance angle side of the second or third cylinder Ref signal rise timing. Specifically, in FIG. 5, a reference symbol STANGa designates a compression start crank angle in an example when the compression start crank angle STANG is located on the advance angle side from the second or third cylinder Ref signal rise timing, and a reference symbol STANGb designates a compression start crank angle in an example when the compression start crank angle STANG is located on the retard angle side from the second or third cylinder Ref signal rise timing.

When the compression start crank angle STANG is on the advanced side of the Ref signal rise timing (e.g., STANGa of FIG. 5), the common-rail fuel pressure is increased at an interval (e.g., an interval a of FIG. 5) between time t2 and time t3. For this reason, a crank angle interval (16.8°) from the position where the plunger lift amount of the plunger pump 14 is zero to time t2 becomes a lift amount computation start crank angle A, and a crank angle interval (16.8°+ANGTM) from the position where the plunger lift amount of the plunger pump 14 is zero to the time t3 becomes a lift amount computation end crank angle B.

On the other hand, when the compression start crank angle STANG is on the retard side of the Ref signal rise timing (e.g., STANGb of FIG. 5), the common-rail fuel pressure is increased at an interval (interval b of FIG. 5) between time tb and time t3. For this reason, the crank angle interval (STANGb) from the position where the plunger lift amount of the plunger pump 14 is zero to time tb becomes the lift amount computation start crank angle A, and the crank angle interval (16.8°+ANGTM) from the position where the plunger lift amount of the plunger pump 14 is zero to time t3 becomes the lift amount computation end crank angle B.

Therefore, when the compression start crank angle STANG is located on the advance angle side from the second or third cylinder Ref signal rise timing (e.g., STANGa), the control process proceeds to step S44. In step S44, the engine controller 41 is configured to set the value of 16.8° serving as the second or third cylinder Ref signal input timing to the lift amount computation start crank angle A (°). As shown in FIG. 5, the value 16.8° is the crank angle interval from the position where the plunger lift amount of the plunger pump 14 becomes zero to the second cylinder (or third cylinder) Ref signal rise timing. The reason why the second or third cylinder Ref signal input timing is set to the lift amount computation start crank angle A when the compression start crank angle STANG is located on the advance angle side (e.g., STANGa) from the second or third cylinder Ref signal rise timing is as follows. Even if the compression of the plunger pump 14 is started before the second or third cylinder Ref signal rise timing, the compression stroke injection start time computation timing is the second or third cylinder Ref signal rise timing, and the fuel pressure at compression stroke injection timing is predicted at the compression stroke injection start time computation timing.

On the other hand, when the compression start crank angle STANG is located on the retard angle side from the second or third cylinder Ref signal rise timing (e.g., STANGb), the control process proceeds to step S45. In step S45, the engine controller 41 is configured to set the compression start crank angle STANG computed in FIG. 8 to the lift amount computation start crank angle A (°). The compression start crank angle STANG is set to the lift amount computation start crank angle A when the compression start crank angle STANG is located on the retard angle side from the second or third cylinder Ref signal rise timing because the compression of the plunger pump 14 is first started at the compression start crank angle STANG.

In step S46, the engine controller 41 is configured to compute a value obtained by adding 16.8° to the injection start crank angle ANGTM computed in the flowchart of FIG. 10 as the lift amount computation end crank angle B (°). The value 16.8° is added here because a unit is unified with the lift amount computation start crank angle A. That is, because the injection start crank angle ANGTM is a value based on the Ref signal rise timing, it is necessary to add 16.8° in order to convert the injection start crank angle ANGTM into the value based on the position where the plunger lift amount of the plunger pump 14 becomes zero.

Figure 13:
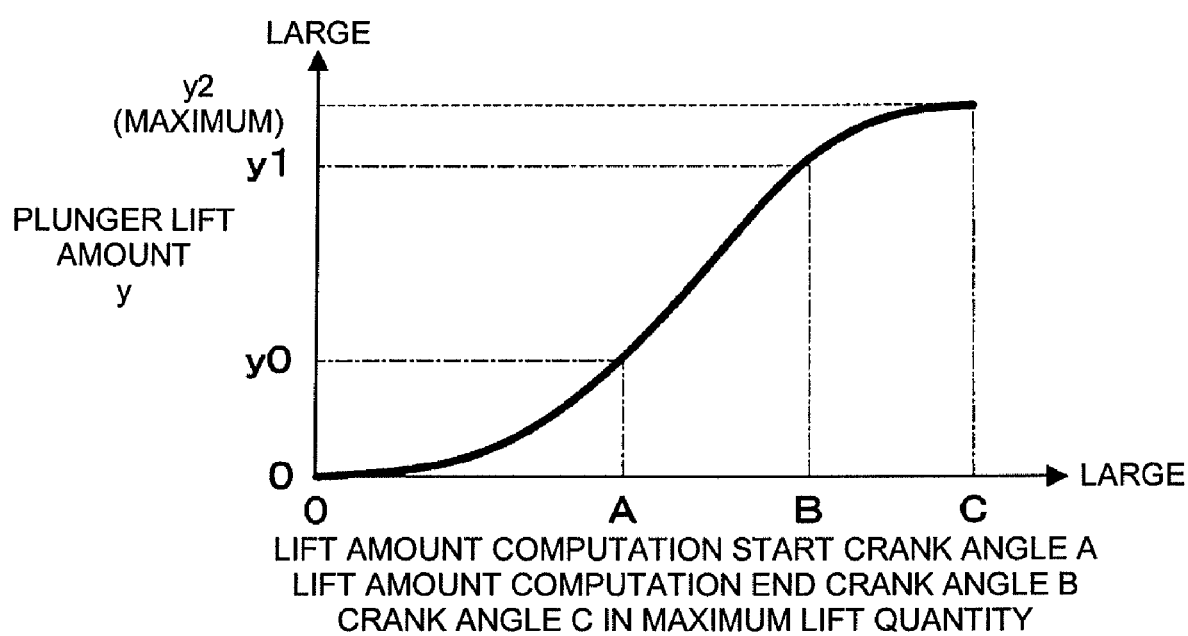
FIG. 13 is an example of a characteristic diagram of a plunger lift amount with respect to a crank angle used in the engine fuel supply apparatus according to the first embodiment of the present invention.

In step S47, the engine controller 41 is configured to determine a plunger lift amount y0 (mm) at the lift amount computation start crank angle A and a plunger lift amount y1 (mm) at the lift amount computation end crank angle B by searching a table such as one shown in FIG. 13 based on the lift amount computation start crank angle A and the lift amount computation end crank angle B.

As shown in the table of the plunger lift amount in FIG. 13, the plunger lift amount characteristics are shown when the plunger lift amount ranges from the position of zero to the position of the maximum lift amount y2.

In step S48, the engine controller 41 is configured to compute a basic value of the common-rail fuel pressure increase ΔPcom1 (Pa) between the second or third cylinder compression stroke injection start time computation timing and the second or third cylinder compression stroke injection timing, using the plunger lift amounts y0 and y1 according to the following formula (3).

$$\Delta Pcom1 = K \cdot (y1-y0) \cdot Apump/(Vcom+V0pump-y0 \cdot Apump) \quad (3)$$

In the formula (3) above, the value K denotes a volume elastic modulus, the value Apump denotes a plunger sectional area of the plunger pump, the value V0pump denotes a maximum volume of the compression chamber of the plunger pump, and the value Vcom denotes a common-rail volume.

The interval between the lift amount computation start crank angle A and the lift amount computation end crank angle B corresponds to the crank angle interval between the compression stroke injection time computation timing and the compression stroke injection timing. Therefore, the formula (3) estimates the increase of common-rail fuel pressure between the second or third cylinder compression stroke injection start time computation timing and the second or third cylinder compression stroke injection timing based on the crank angle interval (B-A) and the plunger lift amount (FIG. 13) of the pump plunger 14*b* (i.e., y1-y0).

In the formula (3), the volume elastic modulus K, the plunger sectional area Apump of the plunger pump, the maximum volume V0pump of the compression chamber of the plunger pump, and the common-rail volume Vcom are constant values.

The formula (3) is obtained as follows. FIG. 17 shows a volume model of the plunger pump 14 and common-rail 21. Referring to FIG. 17, when the pump plunger 14*b* is increased from the position of the plunger lift amount y0 to the position of the plunger lift amount y1 to compress the compression chamber volume, a pressure increase ΔP is expressed by the following supplemental formula (3').

$$\Delta P = K \cdot \Delta V/V \quad (3')$$

Assuming that a value Apump is the plunger sectional area, a volume decrease ΔV of the right-hand side of the supplemental formula (3') is obtained by the equation "ΔV=(y1-y0)×Apump". Assuming that a value V0pump is the maximum volume of the compression chamber of the plunger pump 14 and Vcom is the common-rail volume, the volume V is obtained by the equation "V=Vcom+V0pump-y0×Apump" after the volume is decreased in the right-hand side of the supplemental formula (3'). The supplemental formula (3') is obtained by substituting the volume decrease ΔV and the volume V for the right-hand side of the supplemental formula (3').

Referring back to FIG. 12A, in step S49, the engine controller 41 is configured to read a common-rail fuel temperature Tf detected by the fuel temperature sensor 47.

In step S50, the engine controller 41 is configured to determine a fuel temperature correction coefficient by searching a table such as one shown in FIG. 14 based on the common-rail fuel temperature Tf.

In step S51, the engine controller 41 is configured to compute a value obtained by multiplying the obtained fuel temperature correction coefficient by the common-rail fuel pressure increase ΔPcom1 as the common-rail fuel pressure increase ΔPcom1 (Pa) which indicates a projected pressure increase from the current timing to the compression stroke injection timing.

When the common-rail fuel temperature Tf deviates from a common-rail fuel temperature reference value (for example, 20° C.), pump efficiency of the plunger pump 14 is changed. The fuel temperature correction coefficient is used to correct the change in pump efficiency for the common-rail fuel temperature reference value.

As shown in FIG. 14, the fuel temperature correction coefficient has a value smaller than 1.0 when the common-rail fuel temperature Tf is higher than the common-rail fuel temperature reference value (e.g., 20° C.), and the fuel temperature correction coefficient has a value larger than 1.0 when the common-rail fuel temperature Tf is lower than the common-rail fuel temperature reference value. This is because the pump efficiency of the plunger pump 14 is decreased compared with the common-rail fuel temperature reference value when the common-rail fuel temperature Tf is higher than the common-rail fuel temperature reference value, and to the contrary, the pump efficiency of the plunger pump 14 is increased compared with the common-rail fuel temperature reference value when the common-rail fuel temperature Tf is lower than the common-rail fuel temperature reference value.

In step S52, the engine controller 41 is configured to read the common-rail fuel pressure weighted average value AVEPF computed in the flowchart shown in FIG. 7. Then, the engine controller 41 is configured to compute a value obtained by adding to the common-rail fuel pressure weighted average value AVEPF to the common-rail fuel pressure increase ΔPcom1 which indicates the projected fuel increase between the current timing and the second or third cylinder compression stroke injection timing as the common-rail fuel pressure estimate value Pcom_y1 (Pa) in the second or third cylinder compression stroke injection timing. In other words, the common-rail fuel pressure estimate value Pcom_y1 at the second or third cylinder compression stroke injection timing is computed from the following formula (4).

$$Pcom\_y1 = AVEPF + \Delta Pcom1 \quad (4)$$

Because the common-rail fuel pressure weighted average value AVEPF in the first term of the right-hand side of the formula (4) is obtained by sampling the value calculated in the flowchart of FIG. 7 at the computation timing of FIGS. 12A and 12B, the common-rail fuel pressure weighted average value AVEPF is a value taken at the second or third cylinder Ref signal input timing.

In the first embodiment, the common-rail fuel pressure weighted average value AVEPF is used as the common-rail fuel pressure at the current timing. Alternatively, the actual common-rail fuel pressure Pf may simply be used instead of the common-rail fuel pressure weighted average value AVEPF.

The processes in steps S53 to S55 of FIG. 12B are similar to those in steps S32 to S34 of FIG. 10. That is, in step S53, the engine controller 41 is configured to compute the second or third cylinder fuel pressure correction coefficient KINJ2 or KINJ3 by searching a table such as one shown in FIG. 15 from the common-rail fuel pressure estimate value Pcom_y1 at the compression stroke injection timing. The characteristic of the fuel pressure correction coefficient shown in FIG. 15 is obtained such that the parameters (the fuel pressure Pf and the fuel pressure correction coefficient KINJ) of the horizontal and vertical axes of FIG. 11 are converted into the parameters Pcom_y1 and KINJ2 (KINJ3), respectively.

In step S54, the engine controller 41 is configured to compute the fuel injection pulse width Ti2 or Ti3 (msec) in the second or third cylinder compression stroke injection using the second or third cylinder fuel pressure correction coefficient KINJ2 or KINJ3 by the following formula (5).

$$Ti2 \text{ or } Ti3 = Tp \times Tfbya \times KINJ2 \text{ or } KINJ3 \times 2 + Ts \qquad (5)$$

As described above, the basic injection pulse width Tp, the target equivalence ratio Tfbya, and the solid injection pulse width Ts in the formula (5) are computed in the background job (not shown).

In step S55, the engine controller 41 is configured to convert the fuel injection pulse width Ti2 or Ti3 in the second or third cylinder compression stroke injection into the crank angle using an engine revolution speed Ne at that time. Then, the crank angle that is more advanced than an injection end time ITend1 (°BTDC) in the compression stroke injection by an amount of the converted crank angle is computed as the second or third cylinder compression stroke injection start time ITst2 or ITst3 (°BTDC). The injection end time ITend1 in the compression stroke injection is a crank angle which is measured from the compression top dead center of each cylinder toward the advance side, and is a fixed value. Therefore, the second or third cylinder compression stroke injection start time ITst2 or ITst3 also is a crank angle which is measured from the compression top dead center of the second or third cylinder toward the advance side.

In step S56, the engine controller 41 is configured to transfer the computed second or third cylinder compression stroke injection start time ITst2 or ITst3 to an output register.

In steps S57 to S60, the engine controller 41 is configured to compute a common-rail fuel pressure estimate value at the third cylinder intake stroke injection timing which occurs subsequent to the second cylinder compression stroke injection timing or a common-rail fuel pressure estimate value at the second cylinder intake stroke injection timing which occurs subsequent to the third cylinder compression stroke injection timing. Hereinafter, the third cylinder intake stroke injection timing which occurs subsequent to the second cylinder compression stroke injection timing or the second cylinder intake stroke injection timing which occurs subsequent to the third cylinder compression stroke injection timing are collectively referred to as "third or second cylinder intake stroke injection timing".

The control processes in steps S57 and S58 are similar to those in steps S48 and S51 of FIG. 12A. That is, in step S57, the engine controller 41 is configured to compute a basic value of the common-rail fuel pressure increase $\Delta$Pcom2 between the second or third cylinder compression stroke injection start time computation timing and the third or second cylinder intake stroke injection timing by using the plunger lift amount y0 (computed in step S47 of FIG. 12A) and the maximum lift amount y2 (mm) (previously determined) according to the following formula (6).

$$\Delta Pcom2 = K \cdot (y2-y0) \cdot Apump / (Vcom + V0pump - y0 \cdot Apump) \qquad (6)$$

In the formula (6) above, the value K denotes a volume elastic modulus, the value Apump denotes a plunger sectional area of the plunger pump, the value V0pump denotes a maximum volume of the compression chamber of the plunger pump, and the value Vcom denotes a common-rail volume.

An interval between the lift amount computation start crank angle A and a crank angle C (see FIG. 13) during the maximum lift corresponds to the crank angle interval between the compression stroke injection time computation timing and the third or second cylinder intake stroke injection timing. For this reason, the formula (6) estimates an increase of common-rail fuel pressure between the second or third cylinder compression stroke injection start time computation timing and the third or second cylinder intake stroke injection timing from the crank angle interval (C-A) and the plunger lift amount (FIG. 13) of the pump plunger 14b (i.e., y2-y0).

In step S58, the engine controller 41 is configured to multiply the fuel temperature correction coefficient obtained in step S50 of FIG. 12A by the basic value of the common-rail fuel pressure increase $\Delta$Pcom2 to obtain the increase $\Delta$Pcom2 (Pa) of the common-rail fuel pressure which is a projected pressure increase between the current timing and the third or second cylinder intake stroke injection timing.

In step S59, the engine controller 41 is configured to compute a common-rail fuel pressure decrease $\Delta$Pinj1 (Pa) caused by the second or third cylinder compression stroke injection by using the common-rail fuel pressure estimate value Pcom_y1 (obtained in step S52 of FIG. 12A) at the second or third cylinder compression stroke injection timing and the fuel injection pulse width Ti2 or Ti3 (obtained in step S54) in the second or third cylinder compression stroke injection according to the following formula (7).

$$\Delta Pinj1 = Ti2 \text{ or } Ti3 \times Q \times SQRT(Pcom\_y1/Pst) \times K/Vcom \qquad (7)$$

In the formula (7) above, the value Q denotes a coefficient expressing a fuel injection valve characteristic, the value Pst denotes a setting fuel pressure of the fuel injection valve, the value K denotes a volume elastic modulus, and the value Vcom denotes a common-rail volume.

The formula (7) is a well-known formula which is derived from specifications (characteristics) of the fuel injection valve. The setting fuel pressure Pst of the fuel injection valve in the right-hand side of the formula (7) is an injection pressure, and is determined in advance according to the specifications of the fuel injection valve. For example, the setting fuel pressure Pst has a value of 350 kPa. The value "SQRT (Pcom_y1/Pst)" in the right-hand side of the formula (7) indicates a square root of the value "Pcom_y1/Pst".

In step S60, the engine controller 41 is configured to read the common-rail fuel pressure weighted average value AVEPF computed in the flowchart of FIG. 7, and the read value is added to the common-rail fuel pressure increase $\Delta$Pcom2 which is the projected pressure increase between the current timing and the third or second cylinder intake stroke injection timing. The common-rail fuel pressure decrease $\Delta$Pinj1 caused by the second or third cylinder compression stroke injection is decreased from the added value to obtain the common-rail fuel pressure estimate value Pcom_y2 (Pa) at the third or second cylinder intake stroke injection timing. In other words, the common-rail fuel pressure estimate value Pcom_y2 at the third or second cylinder intake stroke injection timing is computed according to the following formula (8).

$$Pcom\_y2 = AVEPF + \Delta Pcom2 - \Delta Pinj1 \qquad (8)$$

Because the common-rail fuel pressure weighted average value AVEPF in the first term of the right-hand side of the formula (8) is obtained by sampling the value calculated in the flowchart of FIG. 7 at the computation timing of FIGS. 12A and 12B, the common-rail fuel pressure weighted average value AVEPF is a value taken at the second or third cylinder Ref signal input timing.

In the first embodiment, the common-rail fuel pressure weighted average value AVEPF is used as the common-rail fuel pressure at the current timing. Alternatively, the actual common-rail fuel pressure Pf can simply be used instead of the common-rail fuel pressure weighted average value AVEPF.

The control processes in steps S61 to S64 are similar to those in steps S53 to S56 of FIG. 12B. That is, in step S61, the engine controller 41 is configured to compute the third or second cylinder fuel pressure correction coefficient KINJ3 or KINJ2 by searching the table such as one shown in FIG. 15 based on the common-rail fuel pressure estimate value Pcom_y2 at the third or second cylinder intake stroke injection timing. The characteristic of the fuel pressure correction coefficient shown in FIG. 15 is obtained such that the parameters (the fuel pressure Pf and the fuel pressure correction coefficient KINJ) of the horizontal and vertical axes of FIG. 11 are converted into the parameters Pcom_y2 and KINJ3 or KINJ2, respectively.

In step S62, the engine controller 41 is configured to compute the fuel injection pulse width Ti3·2 (msec) in the third or second cylinder intake stroke injection by using the third or second cylinder fuel pressure correction coefficient KINJ3 or KINJ2 according to the following formula (9).

$$Ti3 \text{ or } Ti2 = Tp \times Tfbya \times KINJ3 \text{ or } KINJ2 \times 2 + Ts \quad (9)$$

As described above, the basic injection pulse width Tp, the target equivalence ratio Tfbya, and the solid injection pulse width Ts in the formula (9) are computed in the background job (not shown).

In step S63, the engine controller 41 is configured to convert the fuel injection pulse width Ti3·2 in the third or second cylinder intake stroke injection into the crank angle using an engine revolution speed Ne at that time. Then, the crank angle that is more advanced than the injection end time ITend2 (°BTDC) in the intake stroke injection by an amount of the converted crank angle is computed as the third or second cylinder intake stroke injection start time ITst3 or ITst2 (°BTDC). The injection end time ITend2 in the intake stroke injection is a crank angle which is measured from the compression top dead center of each cylinder toward the advance side, and is a fixed value. Therefore, the third or second cylinder intake stroke injection start time ITst3 or ITst2 also is a crank angle which is measured from the compression top dead center of the third or second cylinder toward the advance side.

In step S64, the engine controller 41 is configured to transfer the computed third or second cylinder intake stroke injection start time ITst3 or ITst2 to the output register.

On the other hand, when the current Ref signal rise timing is for the first or fourth cylinder in step S42 of FIG. 12A, the control process proceeds to steps S65 to S67 of FIG. 12B.

In steps S65 to S67, as with the processes in steps S32 to S34 of FIG. 10, the first or fourth cylinder compression stroke injection start time is computed. That is, in step S65, the engine controller 41 is configured to read the common-rail fuel pressure weighted average value AVEPF obtained in the flowchart shown in FIG. 7 at the first or fourth cylinder Ref signal rise timing. Then the engine controller 41 is configured to compute a first or fourth cylinder fuel pressure correction coefficient KINJ1 or KINJ4 by searching the table such as one shown in FIG. 11 based on the common-rail fuel pressure weighted average value AVEPF. In step S66, the engine controller 41 is configured to compute a fuel injection pulse width Ti1 or Ti4 (msec) in the first or fourth cylinder compression stroke injection by using the fuel pressure correction coefficient KINJ1 or KINJ4 according to the following formula (10).

$$Ti1 \text{ or } Ti4 = Tp \times Tfbya \times KINJ1 \text{ or } KINJ4 \times 2 + Ts \quad (10)$$

As described above, the basic injection pulse width Tp, the target equivalence ratio Tfbya, and the solid injection pulse width Ts in the formula (10) are computed in the background job (not shown).

In step S67, the engine controller 41 is configured to convert the fuel injection pulse width Ti1 or Ti4 into a crank angle using an engine revolution speed Ne at that time. Then, the engine controller 41 is configured to set a crank angle that is more advanced than the injection end time ITend1 (°BTDC) in the compression stroke injection by an amount of the converted crank angle as the first or fourth cylinder compression stroke injection start time ITst1 or ITst4 (°BTDC). As described above, the injection end time ITend1 in the compression stroke injection is a crank angle which is measured from the compression top dead point of each cylinder toward the advance angle, and is a fixed value. Therefore, the first or fourth cylinder compression stroke injection start time ITst1 or ITst4 also is a crank angle which is measured from the compression top dead point of the first or fourth cylinder toward the advance side.

In step S68, the engine controller 41 is configured to transfer the computed first or fourth cylinder compression stroke injection start time ITst1 or ITst4 to the output register.

In steps S69 and S70, the engine controller 41 is configured to compute a common-rail fuel pressure estimate value at the fourth cylinder intake stroke injection timing which occurs subsequent to the first cylinder compression stroke injection timing or a common-rail fuel pressure estimate value at the first cylinder intake stroke injection timing which occurs subsequent to the fourth cylinder compression stroke injection timing. Hereinafter, the fourth cylinder intake stroke injection timing which occurs subsequent to the first cylinder compression stroke injection timing and the first cylinder intake stroke injection timing which occurs subsequent to the fourth cylinder compression stroke injection timing are collectively referred to as "fourth or first cylinder intake stroke injection timing".

In step S69, the engine controller 41 is configured to compute a common-rail fuel pressure decrease ΔPinj2 (Pa) caused by the first or fourth cylinder compression stroke injection by using the common-rail fuel pressure weighted average value AVEPF computed in the flowchart of FIG. 7 and the fuel injection pulse width Ti1 or Ti4 obtained in step S66 in the first or fourth cylinder compression stroke injection according to the following formula (11).

$$\Delta Pinj2 = Ti1 \text{ or } Ti4 \times Q \times SQRT(AVEPF/Pst) \times K/Vcom \quad (11)$$

In the formula (11) above, the value Q denotes a coefficient expressing a fuel injection valve characteristic, the value Pst denotes a setting fuel pressure of the fuel injection valve, the value K denotes a volume elastic modulus, and the value Vcom denotes a common-rail volume.

The formula (11) is basically similar to the formula (7). The value "SQRT(AVEPF/Pst)" in the right-hand side of the formula (11) indicates a square root of the value "AVEPF/Pst".

In step S70, the engine controller 41 is configured to read the common-rail fuel pressure weighted average value AVEPF computed in the flowchart of FIG. 7. Then, the engine controller 41 is configured to subtract the common-rail fuel pressure decrease ΔPinj2 caused by the first or fourth cylinder compression stroke injection from the common-rail fuel pressure weighted average value AVEPF to obtain a common-rail fuel pressure estimate value Pcom_y3 (Pa) at the fourth or first cylinder intake stroke injection timing. In other words, the common-rail fuel pressure estimate value Pcom_y3 at the first or fourth cylinder compression stroke injection is computed from the following formula (12).

$$Pcom\_y3 = AVEPF - \Delta Pinj2 \quad (12)$$

Because the common-rail fuel pressure weighted average value AVEPF in the first term of the right-hand side of the formula (12) is obtained by sampling the value calculated in the flowchart of FIG. 7 at the computation timing of FIGS. 12A and 12B, the common-rail fuel pressure weighted average value AVEPF is a value taken at the fourth cylinder Ref signal input timing.

In the first embodiment, the common-rail fuel pressure weighted average value AVEPF is used as the common-rail fuel pressure at the current timing. Alternatively, the actual common-rail fuel pressure Pf can simply be used instead of the common-rail fuel pressure weighted average value AVEPF.

The processes in steps S71 to S74 are similar to those in steps S61 to S64 of FIG. 12B. That is, in step S71, the engine controller 41 is configured to compute a fourth or first cylinder fuel pressure correction coefficient KINJ4 or KINJ1 by searching the table such as one shown in FIG. 15 based on the common-rail fuel pressure estimate value Pcom_y3 at the fourth or first cylinder intake stroke injection timing. The characteristic of the fuel pressure correction coefficient shown in FIG. 15 are obtained such that the parameters (the fuel pressure Pf and the fuel pressure correction coefficient KINJ) of the horizontal and vertical axes of FIG. 11 are converted into the parameters Pcom_y3 and KINJ4 or KINJ1, respectively.

In step S72, the engine controller 41 is configured to compute a fuel injection pulse width Ti4 or Ti1 (msec) in the fourth or first cylinder intake stroke injection by using the fourth or first cylinder fuel pressure correction coefficient KINJ4 or KINJ1 according to the following formula (13).

$$Ti4 \text{ or } Ti1 = Tp \times Tfbya \times KINJ4 \text{ or } KINJ1 \times 2 + Ts \quad (13)$$

As described above, the basic injection pulse width Tp, the target equivalence ratio Tfbya, and the solid injection pulse width Ts in the formula (13) are computed in the background job (not shown).

In step S73, the engine controller 41 is configured to convert the fuel injection pulse width Ti4 or Ti1 in the fourth or first cylinder intake stroke injection into the crank angle using an engine revolution speed Ne at that time. Then, the engine controller 41 is configured to compute the crank angle that is more advanced than the injection end time ITend2 (°BTDC) in the intake stroke injection by an amount of the converted crank angle as a fourth or first cylinder intake stroke injection start time ITst4 or ITst1 (°BTDC). As described above, the injection end time ITend2 in the intake stroke injection is a crank angle which is measured from the compression top dead point of each cylinder toward the advance side, and is a fixed value. Therefore, the fourth or first cylinder intake stroke injection start time ITst4 or ITst1 is also a crank angle which is measured from the compression top dead point of the fourth or first cylinder toward the advance side.

In step S74, the engine controller 41 is configured to transfer the computed fourth or first cylinder intake stroke injection start time ITst4 or ITst1 to the output register.

Finally, in step S75, the engine controller 41 is configured to set the compression stroke injection enabling flag to 1, and the control process for this cycle is ended.

In the present invention, the intake stroke injection is performed in the homogeneous combustion region, and the present invention is not directed to the fuel injection control in the homogeneous combustion region, i.e., in the stratified combustion enabling flag=0. For this reason, the description of computation for the fuel injection pulse width in the homogeneous combustion region is omitted.

FIG. 16A is a flowchart illustrating a control process for performing the compression stroke injection. The compression stroke injection control of FIG. 16A is performed at the compression stroke injection start timing of each cylinder.

In step S81, the engine controller 41 is configured to check the injection inhibiting flag set in the flowchart of FIG. 6. When the injection inhibiting flag is set to 1, the process is ended without performing the compression stroke injection.

On the other hand, when the injection inhibiting flag is set to zero, the control process proceeds to step S82. In step S82, the engine controller 41 is configured to check the compression stroke injection enabling flag set in the flowchart of FIGS. 12A and 12B. When the compression stroke injection enabling flag is set to zero, the process is ended.

When the compression stroke injection enabling flag is set to 1, the control process proceeds to step S83, in which the engine controller 41 is configured to check whether or not the second or third cylinder compression stroke injection timing comes. When the second or third cylinder compression stroke injection timing comes, the control process proceeds to step S84. In step S84, the engine controller 41 is configured to perform the compression stroke injection for the second or third cylinder using the second or third cylinder compression stroke injection start time ITst2 or ITst3 and the injection end time ITend1 in the compression stroke injection. That is, the engine controller 41 is configured to open the second cylinder fuel injection valve 31B or the third cylinder fuel injection valve 31C for a period between the compression stroke injection start time ITst2 or ITst3 and the injection end time ITend1 in the second or third cylinder compression stroke injection.

When the first or fourth cylinder compression stroke injection start timing comes, the control process proceeds to step S85. In step S85, the engine controller 41 is configured to perform the compression stroke injection for the first or fourth cylinder using the first or fourth cylinder compression stroke injection start time ITst1 or ITst4 and the injection end time ITend1 in the compression stroke injection. That is, the engine controller 41 is configured to open the first cylinder fuel injection valve 31A or the fourth cylinder fuel injection valve 31D for a period between the compression stroke injection start time ITst1 or ITst4 and the injection end time ITend1 in the first or fourth cylinder compression stroke injection.

Figure 16B:
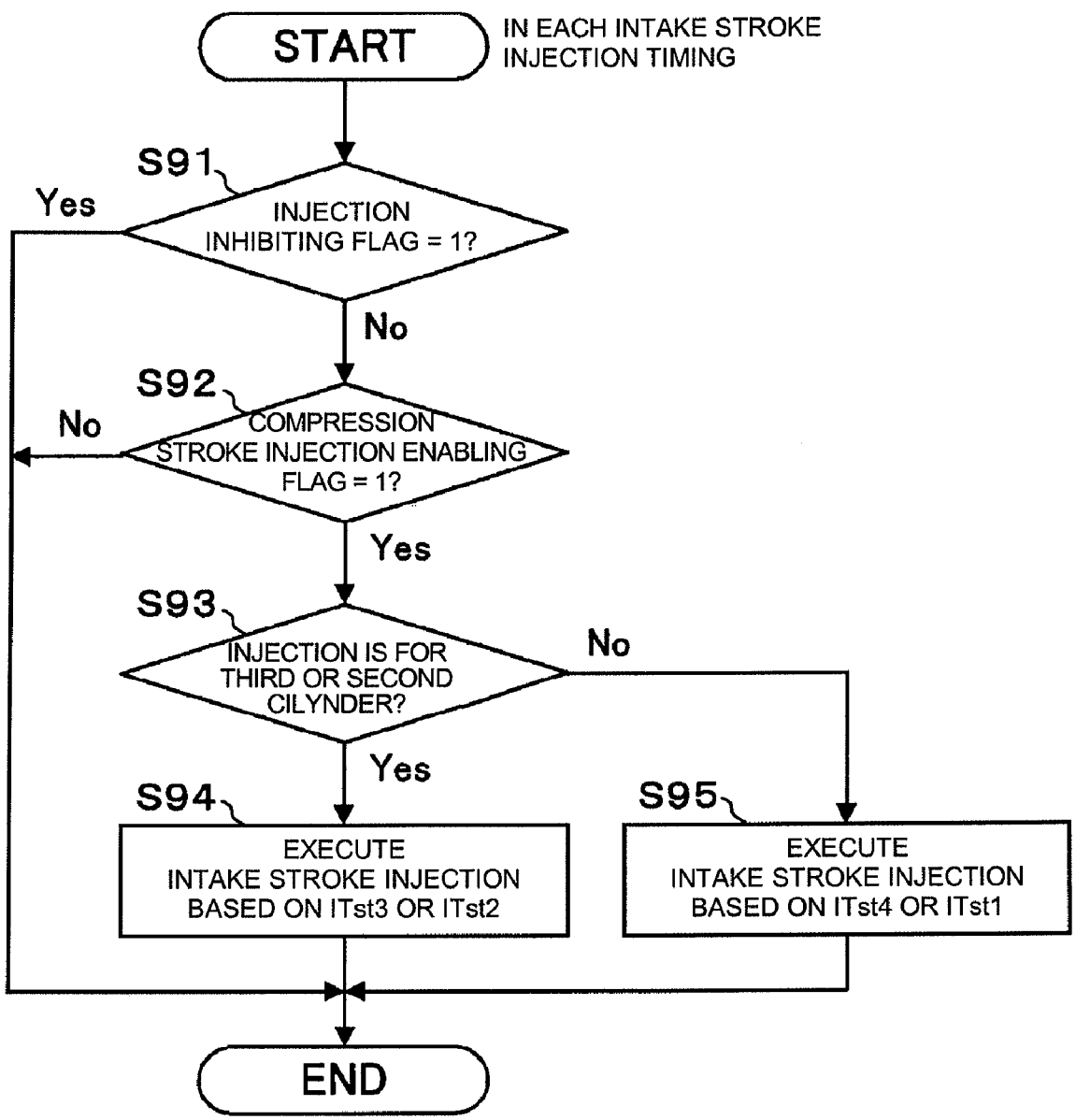
FIG. 16B is a flowchart for explaining a control process for executing a intake stroke injection executed in the engine fuel supply apparatus according to the first embodiment of the present invention.

FIG. 16B is a flowchart illustrating a control process for performing the intake stroke injection. The intake stroke injection control of FIG. 16B is performed at the intake stroke injection start timing of each cylinder.

In step S91, the engine controller 41 is configured to check the injection inhibiting flag set in the flowchart of FIG. 6. When the injection inhibiting flag is set to 1, the process is ended without performing the intake stroke injection.

On the other hand, when the injection inhibiting flag is set to zero, the control process proceeds to step S92, in which the engine controller 41 is configured to check the compression stroke injection enabling flag set in the flowchart of FIGS. 12A and 12B. When the compression stroke injection enabling flag is set to zero, the process is ended.

When the compression stroke injection enabling flag is set to 1, the control process proceeds to step S93, in which the engine controller 41 is configured to check whether or not the third or second cylinder intake stroke injection timing comes. When the third or second cylinder intake stroke injection timing comes, the control process proceeds to step S94. In step S94, the engine controller 41 is configured to perform the intake stroke injection for the third or second cylinder using the third or second cylinder intake stroke injection start time ITst3 or ITst2 and an injection end time ITend2 in the intake stroke injection. That is, the engine controller 41 is configured to open the third cylinder fuel injection valve 31C or the second cylinder fuel injection valve 31B for a period between the intake stroke injection start time ITst3 or ITst2 and the injection end time ITend2 in the third or second cylinder intake stroke injection.

When the fourth or first cylinder intake stroke injection start timing comes, the control process proceeds to step S95, in which the engine controller 41 is configured to perform the intake stroke injection for the fourth or first cylinder using the fourth or first cylinder intake stroke injection start time ITst4 or ITst1 and the injection end time ITend2 in the intake stroke injection. That is, the engine controller 41 opens the fourth cylinder fuel injection valve 31D or the first cylinder fuel injection valve 31A for a period between the intake stroke injection start time ITst4 or ITst1 and the injection end time ITend2 in the fourth or first cylinder intake stroke injection.

The effects of the first embodiment will be described below.

According to the first embodiment, the fuel injection amount (Tp) is corrected not based on the fuel pressure (Pf) at the compression stroke injection start time computation timing (at the computation timing in the first fuel injection). More specifically, the amount of change in fuel pressure until the compression stroke injection timing at which the fuel is actually injected is estimated at the compression stroke injection start time computation timing and the compression stroke injection timing (first fuel injection timing) based on the control state of the fuel pneumatic transportation amount of the high-pressure fuel pump, so that the fuel pressure which will act on the fuel injection valve at the compression stroke injection timing is estimated. Then, the fuel injection amount (Tp) is corrected based on the estimate value Pcom_y1 (first fuel pressure estimate value) which is the estimate value of the fuel pressure at the compression stroke injection timing (see steps S42, S48, and S52 of FIG. 12A, steps S53, S54, S55, and S56 of FIG. 12B, and steps S83 and S84 of FIG. 16A). Consequently, the fuel can be supplied with no excessive fuel injection amount at the compression stroke injection timing (first fuel injection timing) according to the actual fuel pressure, and it is possible to enhance the accuracy of the fuel injection amount correction with the fuel pressure at the compression stroke injection timing.

Additionally, according to the first embodiment, the amount of change in fuel pressure between the compression stroke injection start time computation timing and the intake stroke injection timing (second fuel injection timing) at which the fuel is actually injected is estimated at the compression stroke injection start time computation timing (computation timing in first fuel injection) based on the control state of the fuel pneumatic transportation amount of the high-pressure fuel pump. Therefore, the fuel pressure which will act on the fuel injection valve at the intake stroke injection timing is estimated. Then, the fuel injection amount (Tp) is corrected based on the estimate value Pcom_y2 (second fuel pressure estimate value) which is the estimate value of the fuel pressure estimate value at the intake stroke injection timing (see steps S57, S58, S59, S60, S61, S62, and S63 of FIG. 12B and steps S93 and S94 of FIG. 16B). As a consequence, the fuel can be supplied with no excessive fuel injection amount at the intake stroke injection timing (second fuel injection timing) according to the actual fuel pressure, and it is possible to enhance the accuracy of the fuel injection amount correction with the fuel pressure at the intake stroke injection timing.

Second Embodiment

Figure 19:
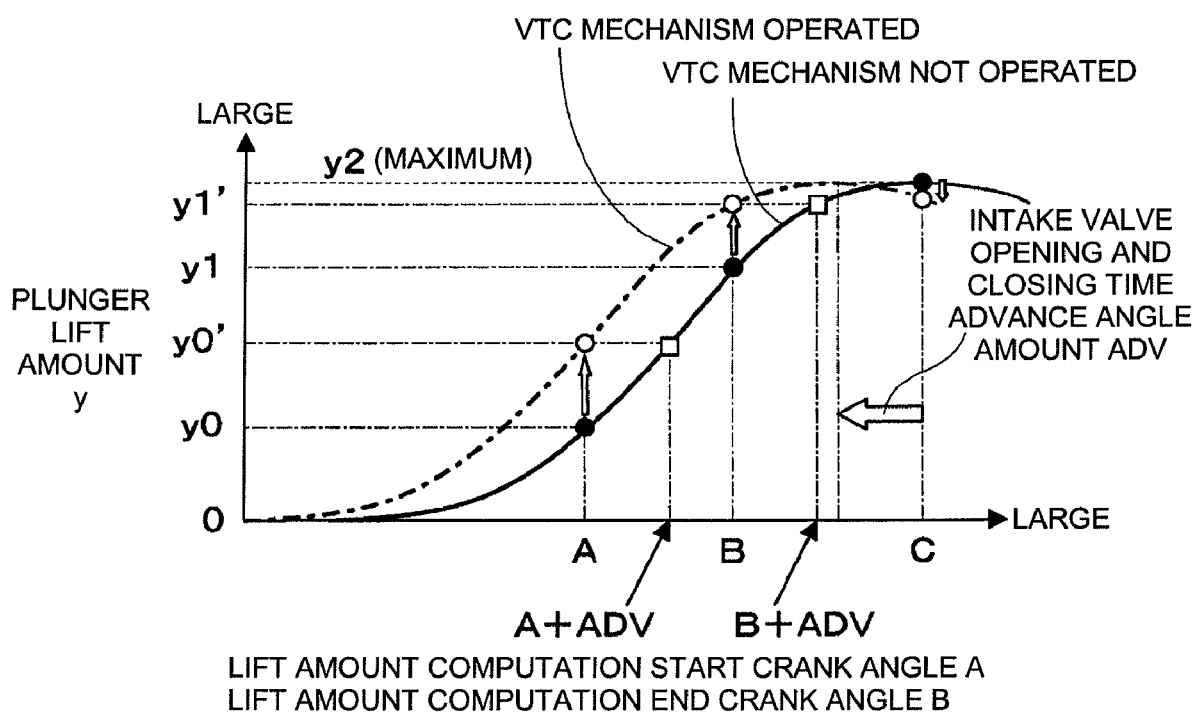
FIG. 19 is an example of a characteristic diagram showing a plunger lift amount with respect to a crank angle used in an engine fuel supply apparatus according to a second embodiment of the present invention.
Figure 20A:
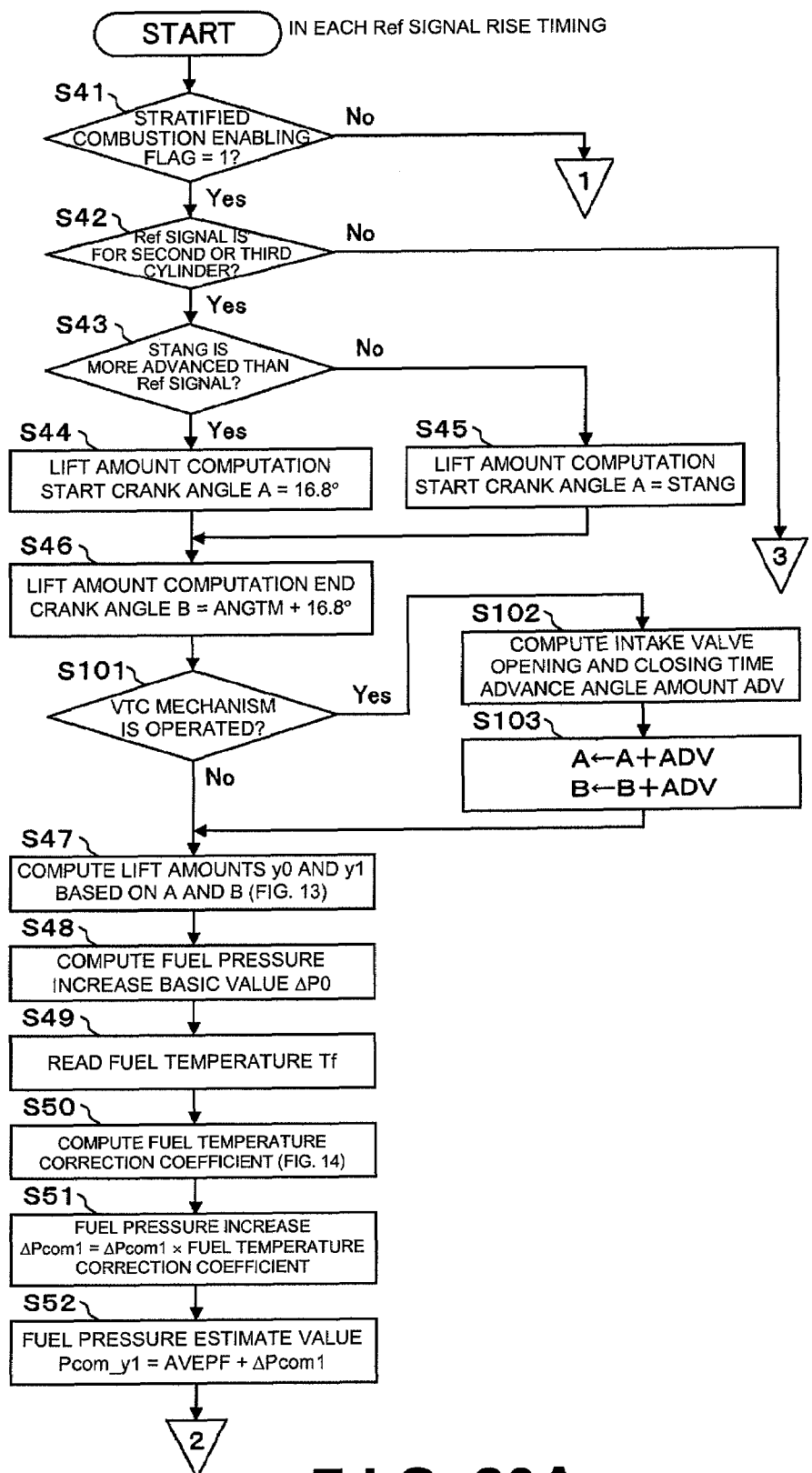
FIGS. 20A and 20B illustrate a flowchart for explaining a control process for computing a compression stroke injection start time and an intake stroke injection start time executed in the engine fuel supply apparatus according to the second embodiment of the present invention.
Figure 20B:
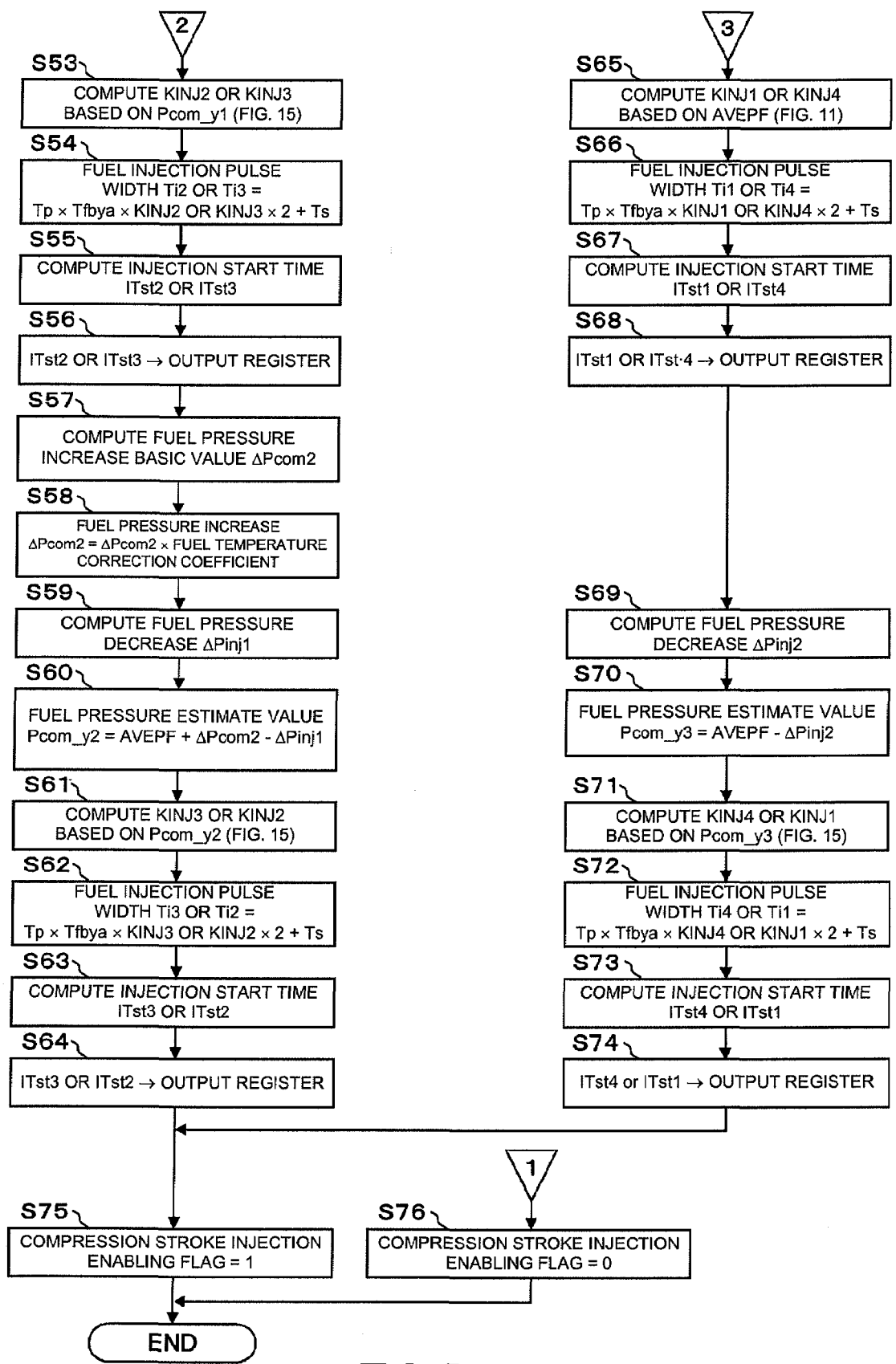

Referring now to FIGS. 19, 20A and 20B, an engine fuel supply apparatus and an engine fuel supply method in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The engine fuel supply apparatus of the third embodiment is adapted to an engine provided with a valve timing control mechanism (hereinafter referred to as "VTC mechanism") operatively coupled to the intake valve camshaft 13 (FIG. 1). The VTC mechanism is configured and arranged to continuously control a phase of the intake valve at any position while an operating angle is kept constant.

Because the VTC mechanism is well-known in the art, the detailed description thereof is omitted. For example, in a conventional electromagnetic VTC mechanism, when a voltage is applied to an electromagnetic retarder to generate magnetic force, the magnetic force overcomes a force imparted by a torsion spring to apply the brake of rotation of a drum, which advances the angle of the intake valve camshaft. The electromagnetic VTC mechanism is in an initial state when the voltage is not applied to the electromagnetic retarder, and the intake valve camshaft (intake valve) is located at a position of the most retard angle when the electromagnetic VTC mechanism is in the initial state. The engine controller 41 is configured to keep a balance between improvement of output/torque and the fuel consumption/exhaust performance by continuously controlling the intake valve opening time through the VTC mechanism according to the operating condition.

FIG. 19 is an example of a characteristic diagram showing a plunger lift amount with respect to a crank angle used in an engine fuel supply apparatus according to the second embodiment. FIGS. 20A and 20B is a flowchart for explaining a control process for computing a compression stroke injection start time and an intake stroke injection start time executed in the engine fuel supply apparatus according to the second embodiment. The second embodiment of the present invention is basically identical to the first embodiment except that the flowchart shown in FIGS. 12A and 12B for the first embodiment is replaced by the flowchart shown in FIGS. 20A and 20B in the second embodiment. In FIGS. 20A and 20B, the same control process as that of the flowchart shown in FIGS. 12A and 12B is designated by the same step number.

More specifically, the flowchart shown in FIGS. 20A and 20B in the second embodiment differs mainly in steps S101, S102, and S103 of FIG. 20A from the flowchart shown in FIGS. 12A and 12B in the first embodiment.

In step S101, the engine controller 41 is configured to determine whether or not the VTC mechanism is operated. That is, the engine controller 41 is configured to check whether or not a signal is outputted to the VTC mechanism. When a signal is not outputted to the VTC mechanism (VTC mechanism is not operated), the control process proceeds to step S47.

In step S47, similarly to the first embodiment, the engine controller 41 is configured to obtain the plunger lift amount y0 (mm) at the lift amount computation start crank angle A and the plunger lift amount y1 (mm) at the lift amount computation end crank angle B by searching the table such as one shown in FIG. 13 based on the lift amount computation start crank angle A and the lift amount computation end crank angle B.

On the other hand, when a signal is outputted to the VTC mechanism (VTC mechanism is operated) in step S101, the control process proceeds to step S102.

In step S102, the engine controller 41 is configured to compute an intake valve opening and closing time advance angle amount ADV of the VTC mechanism. The intake valve opening and closing time advance angle amount ADV is determined based on a control amount to the VTC mechanism.

In step S103, the engine controller 41 is configured to add the intake valve opening and closing time advance angle amount ADV to the lift amount computation start crank angle A and the lift amount computation end crank angle B, which are determined in steps S44 to S46, to respectively obtain an adjusted lift amount computation start crank angle A and an lift amount computation end crank angle B. Then the control process proceeds to step S47.

In step S47, the engine controller 41 is configured to search the table such as one shown in FIG. 13 based on the obtained lift amount computation start crank angle A and lift amount computation end crank angle B to compute the plunger lift amount y0 (mm) at the lift amount computation start crank angle A and the plunger lift amount y1 (mm) at the lift amount computation end crank angle B.

The addition of the intake valve opening and closing time advance angle amount ADV in step S103 will be described with reference to FIG. 19. In the engine provided with the VTC mechanism, the plunger lift characteristics are as shown by the solid line of FIG. 19 when the VTC mechanism is not operated, and the plunger lift characteristics are moved to (toward the advance angle) the one shown by an alternate long and short dash line when the intake valve opening and closing time is advanced by the advance angle amount ADV when the VTC mechanism is operated. For this reason, when the VTC mechanism is operated, the plunger lift amount with respect to the lift amount computation start crank angle A is increased from the plunger lift amount y0 indicated by the position "●" to a plunger lift amount y0' indicated by the position "○". Also, the plunger lift amount with respect to the lift amount computation start crank angle B is increased from the plunger lift amount y1 indicated by the position "●" to a plunger lift amount y1' indicated by the position "○". Therefore, when the VTC mechanism is operated, it is necessary to compute the plunger lift amounts y0' and y1'. The plunger lift characteristics indicated by the alternate long and short dash line is obtained by moving the plunger lift characteristics indicated by the solid line in parallel toward the advance side by the intake valve opening and closing time advance angle amount ADV. For this reason, searching the plunger lift characteristics indicated by the alternate long and short dash line based on the crank angles A and B to determine the plunger lift amounts y0' and y1' is equal to searching the plunger lift characteristics indicated by the solid line based on the crank angles A+ADV and B+ADV obtained by adding the crank angle ADV to the crank angles A and B to determine plunger lift amounts y0' and y1'. That is, the plunger lift amount of y1' at the position "□" is equal to the plunger lift amount y1' at the position "○". Therefore, the plunger lift amounts y0' and y1' can be obtained by searching with the solid-line characteristics which are the characteristics when the VTC mechanism is not operated, i.e., the characteristics of FIG. 13, based on the crank angles A+ADV and B+ADV. The plunger lift amount with respect to the crank angle C is decreased from the maximum lift amount y2 at the position "●" to the plunger lift amount at the position "○". However, because the decrease in the plunger lift amount to the crank angle C is small, the decrease in the plunger lift amount can be neglected.

Thus, according to the second embodiment, even in the engine provided with the VTC mechanism, the plunger lift amount y0' with respect to the lift amount computation start crank angle A and the plunger lift amount y1' with respect to the lift amount computation end crank angle B can be obtained using the plunger lift characteristics (FIG. 13) that is prepared for a case in which the VTC mechanism is not operated.

In the illustrated embodiments of the present invention, the fuel pressure increase ΔPcom1 between the compression stroke injection start time computation timing and the compression stroke injection timing is estimated based on the plunger lift amount of the pump plunger 14b and the crank angle interval (ANGTM) between the compression stroke injection start time computation timing and the compression stroke injection timing. Alternatively, the cam profile of the pump drive cam 12 may be used in place of the plunger lift amount of the pump plunger 14b.

In the illustrated embodiments, the compression stroke injection start time and the intake stroke injection start time are computed while the compression stroke injection end time and the intake stroke injection end time are fixed. However, the present invention can also be applied to the case in which the compression stroke injection end time and the intake stroke injection end time are computed while the compression stroke injection start time and the intake stroke injection start time are fixed.

In the illustrated embodiments, the compression stroke injection start time computation timing is set to the Ref signal rise timing. However, the compression stroke injection start time computation timing can be set to the Ref signal fall timing. Moreover, the present invention is not limited to the arrangement in which the Ref signal timing is used as the compression stroke injection start time computation timing. The present invention can be carried out as long as the timing at which the compression stroke injection start time (or the compression stroke injection end time) is computed is set prior to the compression stroke injection timing.

In the illustrated embodiments, the pump drive cam 12 is provided in the intake valve camshaft 13, and the high-pressure fuel pump 11 is driven by the pump drive cam 12. The present invention is not limited to the configuration of the illustrated embodiments. For example, a conventional swash plate pump may be used as the high-pressure fuel pump 11, and the pump drive cam 12 may be provided in an exhaust valve camshaft. Moreover, the pump drive cam 12 may be provided in a shaft other than the camshaft.

Although the common-rail 21 is provided in the illustrated embodiments, it is not always necessary to provide the common-rail 21.

The illustrated embodiments are described using the four-cylinder engine as an example of the engine to which the engine fuel supply apparatus of the present invention is applied. However, the present invention is not limited to the four-cylinder engine. Rather, the present invention can also be applied to, for example, a six-cylinder engine and an eight-cylinder engine.

In a first aspect of the present invention, the fuel injection amount computation processing is performed by steps S54 and S62 of FIG. 12B, the fuel pressure estimate value computation processing is performed by steps S48 and S52 of FIG. 12A and steps S57, S59, and S60 of FIG. 12B, the first fuel injection amount correction processing is performed by step S54 of FIG. 12B, the first fuel injection valve opening and closing processing is performed by steps S83 and S84 of FIG. 16A, the second fuel injection amount correction processing is performed by step S62 of FIG. 12B, and the second fuel injection valve opening and closing processing is performed by steps S93 and S94 of FIG. 16B.

In a second aspect of the present invention, the fuel injection amount computation section corresponds to steps S54 and S62 of FIG. 12B, the fuel pressure estimate value computing section corresponds to steps S48 and S52 of FIG. 12A and steps S57, S59, and S60 of FIG. 12B, the first fuel injection amount correcting section corresponds to step S54 of FIG. 12B, the first fuel injection valve opening and closing section corresponds to steps S83 and S84 of FIG. 16A, the second fuel injection amount correcting section corresponds to step S62 of FIG. 12B, and the second fuel injection valve opening and closing section corresponds to steps S93 and S94 of FIG. 16B.

According to the above aspect of the invention, at the fuel injection amount computation timing, the amount of change in fuel pressure until the first fuel injection timing at which the fuel is actually injected is estimated based on the control state of the fuel pneumatic transportation amount of the high-pressure fuel pump, and the fuel injection amount is corrected based on the estimate value (first fuel pressure estimate value) of the fuel pressure. Therefore, the fuel can be supplied without the excessive fuel injection amount according to the actual fuel pressure at the first fuel injection timing. Thus, it is possible to enhance accuracy of the fuel injection amount correction with the fuel pressure at the first fuel injection timing.

Furthermore, at the same timing at which the first fuel injection amount is computed, the amount of change in fuel pressure until the second fuel injection timing at which the fuel is actually injected subsequent to the first fuel injection based on the control state of the fuel pneumatic transportation amount of the high-pressure fuel pump is estimated, and the fuel injection amount is corrected based on the estimate (second fuel pressure estimate value) of the fuel pressure. Accordingly, the fuel can be supplied without the excessive fuel injection amount according to the actual fuel pressure at the second fuel injection timing. Thus, it is also possible to enhance accuracy of the fuel injection amount correction with the fuel pressure at the second fuel injection timing.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An engine fuel supply method comprising:
    driving a high-pressure fuel pump to pneumatically transport high-pressure fuel to a fuel pipe;
    controlling a fuel pneumatic transportation amount of the high-pressure fuel pump to adjust a fuel pressure in the fuel pipe to a predetermined pressure;
    simultaneously determining a first fuel injection amount for a first fuel injection and a second fuel injection amount for a second fuel injection, which is performed after the first fuel injection, at a fuel injection amount computation timing based on the fuel pressure in the fuel pipe and an operating condition of an engine;
    estimating a first fuel pressure difference between the fuel injection amount computation timing and a first fuel injection timing for the first fuel injection and a second fuel pressure difference between the fuel injection amount computation timing and a second fuel injection timing for the second fuel injection at the fuel injection amount computation timing based on a control state of the fuel pneumatic transportation amount of the high-pressure fuel pump;
    correcting the first fuel injection amount based on the first fuel pressure difference; and
    selectively controlling a fuel injection valve connected with the fuel pipe to supply the high-pressure fuel directly into a cylinder of the engine at the first fuel injection timing with the corrected first fuel injection amount;
    correcting the second fuel injection amount based on the second fuel pressure difference; and
    selectively controlling the fuel injection valve to supply the high-pressure fuel directly into the cylinder of the engine at the second fuel injection timing with the corrected second fuel injection amount.

2. The engine fuel supply method according to claim 1, wherein
    the selectively controlling of the fuel injection valve includes selectively controlling a plurality of fuel injection valves respectively provided in a plurality of cylinders of the engine, and the correcting of the first and second fuel injection amounts and the selectively controlling of the fuel injection valve to supply the high-pressure fuel directly into the cylinder of the engine at the first and second fuel injection timings are performed for each of the cylinders in an order of an ignition sequence of the cylinders.

3. The engine fuel supply method according to claim 1, wherein
the driving of the high-pressure fuel pump includes driving a pump drive cam operatively driven by a crankshaft of the engine to drive the high-pressure fuel pump such that the high-pressure fuel pump discharges the high-pressure fuel in a lift stroke of a pump plunger driven by the pump drive cam and the high-pressure fuel pump retains a constant fuel pressure in a lowering stroke of the pump plunger.

4. The engine fuel supply method according to claim 3, wherein
the estimating of the first fuel pressure difference includes calculating the first fuel pressure difference based on a crank angle interval between the fuel injection amount computation timing and the first fuel injection timing and one of a cam profile of the pump drive cam and a plunger lift amount of the pump plunger when the first fuel injection timing falls within the lift stroke of the pump plunger.

5. The engine fuel supply method according to claim 4, wherein
the estimating of the second fuel pressure difference includes calculating the second fuel pressure difference based on a crank angle interval between the fuel injection amount computation timing and the second fuel injection timing, one of the cam profile of the pump drive cam and the plunger lift amount of the pump plunger, and a fuel pressure decrease amount due to the first fuel injection.

6. The engine fuel supply method according to claim 1, wherein
the selectively controlling of the fuel injection valve to directly supply the high-pressure fuel at the first fuel injection timing includes supplying the high-pressure fuel during a compression stroke of the cylinder, and
the selectively controlling of the fuel injection valve to directly supply the high-pressure fuel at the second fuel injection timing includes supplying the high-pressure fuel during one of an intake stroke and an expansion stroke of the cylinder.

7. The engine fuel supply method according to claim 1, wherein
the estimating of the first and second fuel pressure differences and the correcting of the first and second fuel injection amounts are performed when the engine is operating in a stratified combustion region.

8. The engine fuel supply method according to claim 3, wherein
the estimating of the first fuel pressure difference includes calculating the first fuel pressure difference based on a crank angle interval between the fuel injection amount computation timing and the first fuel injection timing, one of a cam profile of the pump drive cam and a plunger lift amount of the pump plunger, and an operating state of a valve timing control mechanism of one of an intake valve and an exhaust valve of the engine when the first fuel injection timing falls within the lift stroke of the pump plunger.

9. The engine fuel supply method according to claim 8, wherein
the estimating of the second fuel pressure difference includes calculating the second fuel pressure difference based on a crank angle interval between the fuel injection amount computation timing and the second fuel injection timing, one of the cam profile of the pump drive cam and the plunger lift amount of the pump plunger, the operating state of the valve timing control mechanism, and a fuel pressure decrease amount due to the first fuel injection.

10. An engine fuel supply apparatus comprising:
a fuel pressure control section configured to control a fuel pneumatic transportation amount of a high-pressure fuel pump to adjust a fuel pressure in a fuel pipe to a predetermined pressure;
a fuel injection amount computing section configured to simultaneously determine a first fuel injection amount for a first fuel injection and a second fuel injection amount for a second fuel injection, which is performed after the first fuel injection, at a fuel injection amount computation timing based on the fuel pressure in the fuel pipe and an operating condition of an engine;
a fuel pressure estimate value computing section configured to estimate a first fuel pressure difference between the fuel injection amount computation timing and a first fuel injection timing for the first fuel injection and a second fuel pressure difference between the fuel injection amount computation timing and a second fuel injection timing for the second fuel injection at the fuel injection amount computation timing based on a control state of the fuel pneumatic transportation amount of the high-pressure fuel pump;
a first fuel injection amount correcting section configured to correct the first fuel injection amount based on the first fuel pressure difference estimated in the fuel pressure estimate value computing section;
a first fuel injection controlling section configured to selectively control a fuel injection valve connected with the fuel pipe to supply the high-pressure fuel directly into a cylinder of the engine at the first fuel injection timing with the first fuel injection amount corrected in the first fuel injection amount correcting section;
a second fuel injection amount correcting section configured to correct the second fuel injection amount based on the second fuel pressure difference estimated in the fuel pressure estimate value computing section; and
a second fuel injection controlling section configured to selectively control the fuel injection valve to supply the high-pressure fuel directly into the cylinder at the second fuel injection timing with the second fuel injection amount corrected in the second fuel injection amount correcting section.

11. The engine fuel supply apparatus according to claim 10, wherein
the first and second fuel injection controlling sections are further configured to selectively control a plurality of fuel injection valves respectively provided in a plurality of cylinders of the engine,
the first and second fuel injection amount correcting sections are configured to correct the first and second fuel injection amounts for each of the cylinders, respectively, in an order of an ignition sequence of the cylinders, and
the first and second fuel injection controlling sections are selectively control the fuel injection valves to directly supply the high-pressure fuel in the order of the ignition sequence of the cylinders.

12. The engine fuel supply apparatus according to claim 10, wherein the fuel pressure control section is configured to drive a pump drive cam operatively driven by a crankshaft of the engine to control the fuel pneumatic transportation amount of the high-pressure fuel pump such that the high-pressure fuel pump discharges the high-pressure fuel in a lift stroke of a pump plunger driven by the pump drive cam and the high-pressure fuel pump retains a constant fuel pressure in a lowering stroke of the pump plunger.

13. The engine fuel supply apparatus according to claim 12, wherein
the fuel pressure estimate value computing section is further configure to calculate the first fuel pressure difference based on a crank angle interval between the fuel injection amount computation timing and the first fuel injection timing and one of a cam profile of the pump drive cam and a plunger lift amount of the pump plunger when the first fuel injection timing falls within the lift stroke of the pump plunger.

14. The engine fuel supply apparatus according to claim 13, wherein
the fuel pressure estimate value computing section is further configured to calculate the second fuel pressure difference based on a crank angle interval between the fuel injection amount computation timing and the second fuel injection timing, one of the cam profile of the pump drive cam and the plunger lift amount of the pump plunger, and a fuel pressure decrease amount due to the first fuel injection.

15. The engine fuel supply apparatus according to claim 10, wherein
the first fuel injection controlling section is configured to supply the high-pressure fuel directly into the cylinder during a compression stroke of the cylinder, and
the second fuel injection controlling section is configured to supply the high-pressure fuel directly into the cylinder during one of an intake stroke and an expansion stroke of the cylinder.

16. The engine fuel supply apparatus according to claim 10, wherein
the fuel pressure estimate value computing section and the first and second fuel injection amount correcting sections are operated when the engine is operating in a stratified combustion region.

17. The engine fuel supply apparatus according to claim 12, wherein
the fuel pressure estimate value computing section is further configured to calculate the first fuel pressure difference based on a crank angle interval between the fuel injection amount computation timing and the first fuel injection timing, one of a cam profile of the pump drive cam and a plunger lift amount of the pump plunger, and an operating state of a valve timing control mechanism of one of an intake valve and an exhaust valve of the engine when the first fuel injection timing falls within the lift stroke of the pump plunger.

18. The engine fuel supply apparatus according to claim 17, wherein
the fuel pressure estimate value computing section is further configured to calculate the second fuel pressure difference based on a crank angle interval between the fuel injection amount computation timing and the second fuel injection timing, one of the cam profile of the pump drive cam and the plunger lift amount of the pump plunger, the operating state of the valve timing control mechanism, and a fuel pressure decrease amount due to the first fuel injection.

19. An engine fuel supply apparatus comprising:
fuel pressure control means for controlling a fuel pneumatic transportation amount of a high-pressure fuel pump to adjust a fuel pressure in a fuel pipe to a predetermined pressure;
fuel injection amount computing means for simultaneously determining a first fuel injection amount for a first fuel injection and a second fuel injection amount for a second fuel injection that is performed after the first fuel injection at a fuel injection amount computation timing based on the fuel pressure in the fuel pipe and an operating condition of an engine;
fuel pressure estimate value computing means for estimating a first fuel pressure difference between the fuel injection amount computation timing and a first fuel injection timing for the first fuel injection, and a second fuel pressure difference between the fuel injection amount computation timing and a second fuel injection timing for the second fuel injection at the fuel injection amount computation timing based on a control state of the fuel pneumatic transportation amount of the high-pressure fuel pump;
first fuel injection amount correcting means for correcting the first fuel injection amount based on the first fuel pressure difference estimated in the fuel pressure estimate value computing means;
first fuel injection controlling means for selectively controlling a fuel injection valve connected with the fuel pipe to supply the high-pressure fuel directly into a cylinder of the engine at the first fuel injection timing with the first fuel injection amount corrected in the first fuel injection amount correcting means;
second fuel injection amount correcting means for correcting the second fuel injection amount based on the second fuel pressure difference estimated in the fuel pressure estimate value computing means; and
second fuel injection controlling means for selectively controlling the fuel injection valve to supply the high-pressure fuel directly into the cylinder at the second fuel injection timing with the second fuel injection amount corrected in the second fuel injection amount correcting means.

* * * * *